(12) United States Patent
Kobayashi et al.

(10) Patent No.: US 7,148,942 B2
(45) Date of Patent: Dec. 12, 2006

(54) PROTECTIVE FILM FOR POLARIZING PLATE

(75) Inventors: Toru Kobayashi, Tokyo (JP); Kazuhiro Fukuda, Tokyo (JP); Toshiya Takagi, Tokyo (JP); Takashi Murakami, Tokyo (JP); Nobuyuki Takiyama, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/300,400

(22) Filed: Nov. 20, 2002

(65) Prior Publication Data

US 2003/0151707 A1   Aug. 14, 2003

Related U.S. Application Data

(62) Division of application No. 09/548,939, filed on Apr. 13, 2000, now Pat. No. 6,512,562.

(30) Foreign Application Priority Data

Apr. 15, 1999   (JP)   ............................... 11-107836

(51) Int. Cl.
*G02F 1/1333* (2006.01)
*G02F 1/13* (2006.01)
*G02B 5/30* (2006.01)

(52) U.S. Cl. ................... 349/122; 349/96; 349/187; 359/483

(58) Field of Classification Search ............ 349/96, 349/187, 122, 138; 359/483
See application file for complete search history.

(56) References Cited

U.S. PATENT DOCUMENTS

| | | | |
|---|---|---|---|
| 4,372,986 A * | 2/1983 | Imada et al. ............... | 427/536 |
| 4,824,717 A * | 4/1989 | Nakanishi et al. ........... | 442/49 |
| 5,270,259 A * | 12/1993 | Ito et al. ..................... | 438/623 |
| 5,425,832 A * | 6/1995 | Kusano et al. .......... | 156/272.6 |
| 5,543,017 A * | 8/1996 | Uchiyama et al. .......... | 204/169 |

FOREIGN PATENT DOCUMENTS

| | | | |
|---|---|---|---|
| GB | 2 120 827 | * | 12/1983 |
| JP | 61245107 | * | 10/1986 |

* cited by examiner

*Primary Examiner*—Toan Ton
(74) *Attorney, Agent, or Firm*—Frishauf, Holtz, Goodman & Chick, P.C.

(57) ABSTRACT

A protective film for polarizing plate is disclosed in which an contact angle of the surface in contact with a polarizer with respect to pure water is less than 55° and the surface in contact with a polarizer becomes hydrophilic due to a plasma treatment.

In such a manner, the protective film for the polarizing plate is readily adhered with a polyvinyl alcohol film employed as a polarizer and can be produced employing processing which is safe in work and does not adversely affect the environment. Thus highly efficient protective film for the polarizing plate, which exhibits excellent adhesion with a polyvinyl alcohol film, and a polarizing plate employing the same, are provided.

10 Claims, 4 Drawing Sheets

PROTECTIVE FILM FOR POLARIZING PLATE

This is a division of application Ser. No. 09/548,939 filed Apr. 13, 2000, now U.S. Pat. No. 6,512,562.

FIELD OF THE INVENTION

The present invention relates to a protective film for a polarizing plate, which exhibits excellent adhesive properties, and a polarizing plate employing the same, and a production method thereof, and further to a production method of cellulose ester film which exhibits excellent recycling properties.

BACKGROUND OF THE INVENTION

As a protective film employed in the polarizing plate of a liquid crystal display, cellulose esters such as triacetyl cellulose and the like, are suitable due to their lower double refraction, and have frequently been employed.

Commonly, a polarizing plate has such a structure that a polarizing film comprised of a polyvinyl alcohol film and the like, in which iodine or dyes are absorbed and oriented, is laminated on both sides with transparent resin layers. Frequently employed as said transparent resin layer is a protective film comprised of triacetyl cellulose film.

When a polarizing plate is produced by adhering a protective film with a polarizer, in order to readily apply a water-soluble adhesive, a protective film such as triacetyl cellulose film, and the like is temporarily subjected to saponifying treatment through immersion in an alkali solution having a high concentration at a relatively high temperature so that the film surface becomes hydrophilic. Then, an adhesive is applied to said protective film which is adhered with the polarizer. However, it is preferred to make a transparent resin film hydrophilic without employing chemicals for saponification, which are not preferred in view of work as well as troublesome processes.

Further, for a transparent resin film employed as the protective film for the polarizer, triacetyl cellulose is exclusively employed. One of the reasons why triacetyl cellulose has not been replaced by other films is that the other films are not subjected to saponification. Accordingly, another process, which replaces saponification, has been sought.

The present inventors have investigated various methods to make the surface of a transparent resin film hydrophilic, which replace saponification. As a result, it has been discovered that when a transparent resin film is subjected to plasma treatment, it exhibits similar performance obtained by saponification.

SUMMARY OF THE INVENTION

An object of the present invention is to provide a highly efficient protective film for the polarizing plate, which is readily adhered with polyvinyl alcohol film employed as a polarizer, can be produced employing processes which are safe in view of operation and do not adversely affect the environment, and exhibits excellent adhesion with a polyvinyl alcohol film layer, and a polarizing plate employing the same.

Further, another object is to obtain a protective film for the polarizing plate, in which moisture resistance is enhanced employing safe methods for operation, and which exhibits excellent durability. Further, it is possible to obtain a protective film for the polarizing plate, which comprises cellulose ester film which is readily recycled. Still further, it is possible to obtain a polarizing plate as well as a liquid crystal display unit which exhibit excellent durability.

An outline of the present invention will now be described.

1. A protective film for a polarizing plate comprising: a base material, the protective film for the polarizing plate wherein in analysis of bonding state of a carbon atom (C1s)employing X-ray photoelectron spectroscopy, when a peak having the lowest bonding energy is designated as a first peak, a peak positioned at 1.60±0.3 eV on the higher bonding energy side from the first peak is designated as a second peak, and a peak positioned at 4.10±0.3 eV on the higher bonding energy side from the first peak is designated as a third peak, bonding state of carbon atom C1s on a surface of at least one side of the base material and bonding state of internal carbon atom C1s in an optional depth of 0.05 to 1 µm from the surface satisfy relationship described below:

$$S-I \geq 0.1$$

wherein S is intensity of the second peak on the base material surface of the protective film for the polarizing plate/intensity of the first peak on the base material surface of the protective film for the polarizing plate, and I is intensity of the second peak in the interior of the base material of the protective film for the polarizing plate/intensity of the first peak of the interior of the base material of the protective film for the polarizing plate.

2. A protective film for the polarizing plate described in claim 1, wherein $S \geq 1.60$.

3. The protective film for the polarizing plate described in claim 1, wherein the bonding state of carbon atom C1s on the surface of the protective film for the polarizing plate satisfies relationship described below:

$$T \geq 0.2$$

wherein T is intensity of the third peak on the base material surface of the protective film for the polarizing plate/the intensity of the second peak on the base material surface of the protective film for the polarizing plate.

4. The protective film for the polarizing plate described in claim 1 wherein the contact angle of the surface of the base material with respect to pure water is less than 55 degrees.

5. The protective film for the polarizing plate described in claim 1 wherein the contact angle of at least one surface of the protective film for the polarizing plate with respect to pure water is less than 55 degrees.

6. The protective film for the polarizing plate described in claim 1 wherein the surface of the base material is subjected to plasma treatment.

7. The protective film for the polarizing plate described in claim 1, comprising a hydrophilic layer containing a hydrophilic high molecular compound.

8. The protective film for the polarizing plate described in claim 1, wherein the base material is cellulose ester film, polycarbonate film, polyester film, or polyacryl film.

9. The protective film for the polarizing plate described in claim 1, wherein the average of the central line average roughness Ra of 10 points on the surface of the protective film for the polarizing plate is between 1 and 80 nm, and the average of the maximum height differences of 10 points arbitrary of said surface is between 5 and 80 nm.

10. A protective film for the polarizing plate, comprising a base material and an auxiliary layer, a protective film for the polarizing plate wherein in analysis of bonding state of carbon atom (C1s) employing X-ray photoelectron spectroscopy, when a peak having the lowest bonding energy is designated as a first peak, a peak positioned at 1.60±0.3 eV on the higher bonding energy side from the first peak is designated as a second peak, and a peak positioned at 4.10±0.3 eV on the higher bonding energy side from the first peak is designated as a third peak, bonding state of carbon atom C1s on a surface of at least one side of the auxiliary layer and bonding state of internal carbon atom C1s of the auxiliary layer in an optional depth of 0.05 to 1 μm from the surface satisfy relationship described below:

$$S'-I' \geqq 0.1$$

wherein S' is intensity of the second peak on the auxiliary layer surface of the protective film for the polarizing plate/intensity of the first peak on the auxiliary layer surface of the protective film for the polarizing plate, and I' is intensity of the second peak in the interior of the auxiliary layer of the protective film for the polarizing plate/intensity of the first peak of the interior of the auxiliary layer of the protective film for the polarizing plate.

11. A protective film for a polarizing plate, comprising a base material wherein at least one surface of the base material is subjected to plasma treatment.

12. A protective film for a polarizing plate, comprising a base material and an auxiliary layer, wherein the surface of the auxiliary layer is subjected to plasma treatment.

13. A polarizing plate, comprising a first protective film, polarizer and a second protective film, wherein at least one of the first protective film and the second protective film comprises a base material, and in analysis of bonding state of a carbon atom employing X-ray photoelectron spectroscopy, when a peak having the lowest bonding energy is designated as a first peak, a peak positioned at 1.60±0.3 eV on the higher bonding energy side from the first peak is designated as a second peak, and a peak positioned at 4.10±0.3 eV on the higher bonding energy side from the first peak is designated as a third peak, bonding state of carbon atom C1s on the surface of at least one side of the base material and bonding state of internal carbon atom C1s in an optional depth of 0.05 to 1 μm from the surface satisfy relationship described below:

$$S-I \geqq 0.1$$

wherein S is intensity of the second peak on the base material surface intensity of the first peak on the base material surface, and I is intensity of the second peak in the interior of the base material intensity of the first peak of the interior of the base.

14. A liquid crystal display unit comprising a first polarizing plate, a liquid crystal cell, and a second polarizing plate provided in the inside of the first polarizing plate and the liquid crystal cell, wherein the first polarizing plate comprises
a first polarizer,
a first protective film provided to the surface of the first polarizer on the side which does not face the liquid crystal cell, and
a second protective film provided on the surface of the first polarizer on the side which faces the liquid crystal cell;

the second polarizing plate comprises
a second polarizer,
a third protective film provided to the surface of the second polarizer on the side which faces the liquid crystal cell, and
a fourth protective film provided to the surface of the second polarizer on the side which does not face the liquid crystal cell;

at least one of the first protective film, the second protective film, the third protective film, and the fourth protective film comprises a base material; and in analysis of bonding state of a carbon atom (C1s) employing X-ray photoelectron spectroscopy, when a peak having the lowest bonding energy is designated as a first peak, a peak positioned at 1.60±0.3 eV on the higher bonding energy side from the first peak is designated as a second peak, and a peak positioned at 4.10±0.3 eV on the higher bonding energy side from the first peak is designated as a third peak, bonding state of carbon atom C1s on a surface of at least one side of the base material and bonding state of internal carbon atom C1s in an optional depth of 0.05 to 1 μm from the surface satisfy relationship described below:

$$S-I \geqq 0.1$$

wherein S is intensity of the second peak on the base material surface intensity of the first peak on the base material surface, and I is the intensity of the second peak in the interior of the base material intensity of the first peak of the interior of the base.

15. A production method of a protective film for a polarizing plate, comprising the following steps, and a step in which a prepared film is subjected to plasma treatment.

16. The production method described in claim 15, wherein the plasma treatment is a vacuum glow discharge, an atmospheric pressure glow discharge, or a flame plasma treatment.

17. The production method described in claim 15 wherein the plasma treatment is carried out a plurality of times.

18. The production method described in claim 15, wherein the plasma treatment is subsequently or simultaneously carried out under the conditions in which the C—C bond or C—H bond of the organic substance on the film surface is broken, or a hydroxyl group or amino group is formed on the film surface.

19. A production method of a polarizing plate comprising following steps:
a step in which the surface of a polarizer or a surface of a protective film for the polarizing plate is subjected to plasma treatment, and
a step in which the protective film subjected to plasma treatment for the polarizing plate is adhered with at least one of polarizer surfaces or a protective film for the polarizing plate is at least one of polarizer surfaces subjected to plasma treatment.

20. The production method described in claim 19, wherein after plasma treatment and before adhering the protective film for the polarizing plate with a polarizer, the surface which has been subjected to plasma treatment is washed with water.

DETAILED DESCRIPTION OF THE INVENTION

Figure 1:
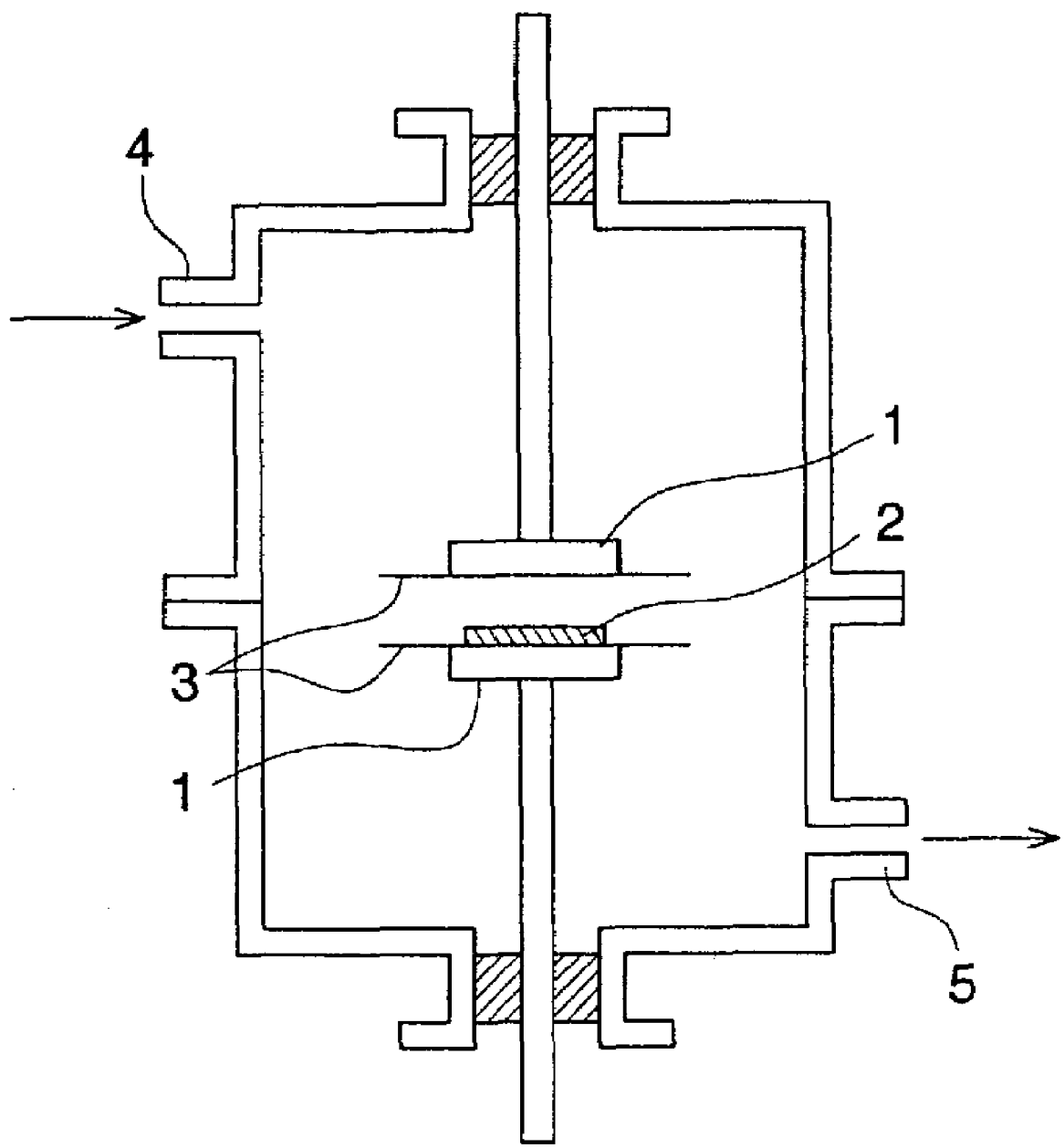
FIG. 1 is a cross-sectional view showing one example of an atmospheric pressure plasma treatment apparatus.

The present invention will be detailed below.

Polarizing films are widely employed as liquid crystal display elements in the display panel of desktop calculators, personal computers, liquid crystal television sets, and displays in cars. As described above, such polarizing films have a structure in which a polarizer prepared by adsorbing and orienting iodine or dichroic dyes onto polyvinyl alcohol based film is adhered with triacetyl cellulose film as the protective film. The present inventors have investigated the following; the elimination of treatments which are not preferred in view of operation during production of triacetyl cellulose film employed for said protective film, the protective film for the polarizing plate, which exhibits excellent adhesion strength, and the production method of a polarizing plate which employs said protective film.

The present invention provides a novel method in which cellulose based film is not subjected to conventional saponification during production of a polarizing plate in which a protective film is adhered with a polarizer prepared by adsorbing and orienting iodine or dichroic dyes onto polyvinyl alcohol based film.

As described above, according to the present invention, it is possible to obtain a film having excellent adhesive properties without saponifying triacetyl cellulose film in strong alkali. Further, since strong alkali hydrolysis is not employed, it is possible to carry out hydrophilic treatment for the surface of triacetyl cellulose as well as other plastics.

In order to enhance the adhesive properties with a polyvinyl alcohol based film employed in a polarizer, materials, which exhibit excellent hydrophilicity, are employed in the protective film for the polarizing plate.

The degree of hydrophilicity of a film surface is expressed by various scales. However, it is convenient to express the degree employing a contact angle which is formed between a drop of water and the surface when water is dropped.

The contact angle is commonly expressed by an angle, including liquid among angles, between a tangential line drawn to the liquid and the solid surface at the contact point of three phases when solid, liquid, and its saturated vapor come into contact. The contact angle closely relates to angle forming solid/surface tension of liquid as well as solid/liquid inter-facial tension. Thus, the contact angle is widely utilized as the measure to express wettability of a solid surface with liquid. In the present invention, for the measurement of hydrophilicity, 5 µl of pure water is placed on the surface of the protective film after the plasma treatment, and the contact angle between the water drop and the protective film is measure at 23° C., employing a measurement apparatus (a goniometer Elmer G1, manufactured by Elmer Kogyo Co., Ltd. is employed). As the hydrophilicity rises, wettability with water is enhanced, and thus, the contact angle decreases. In the present invention, as the standard for the enhancement of hydrophilicity due to the plasma treatment, it is required that the contact angle is 55° or less when it is measured by placing pure water on a protective film surface which faces a polarizer. Further, the contact angle with pure water is preferably between 0 and 50°, and is most preferably between 10 and 40°. Under such conditions, the adhesive strength between the polarizer film surface and the protective film increases and an excellent polarizing plate may be obtained. Herein, pure water, Kind A4, specified in JIS K0557 is preferably employed.

Listed as resin films employed as the protective film for the polarizing plate of the present invention or its base materials may be, for example, polyester films comprised of polyethylene terephthalate, polyethylene naphthalate, and the like, polyethylene film, polypropylene film, cellophane, films comprised of cellulose esters or derivatives thereof such as cellulose diacetate film, cellulose acetate butyrate film, cellulose acetate phthalate film, cellulose acetate propionate film, cellulose triacetate, cellulose nitrate, polyvinylidene chloride film, polyvinyl alcohol film, ethylene vinyl alcohol film, syndioctatic polystyrene based film, polycarbonate film, norbornane resin based film, polymethylpentene film, polyether ketone film, polyether sulfone film, polysulfone based film, polyether ketoneimide film, polyamide film, fluorine resin film, nylon film, polymethyl methacrylate film, acryl film, polyallylate based film, and the like. Films laminated with these resins or films prepared by blending these resins may also be employed.

Other than acetyl cellulose based films (such as cellulose triacetate, cellulose diacetate, cellulose acetate butyrate, and the like), specifically, it is possible to preferably make the surface of polycarbonate, polyester film, polyacryl film, and the like, hydrophilic, employing the process instead of the aforementioned strong alkali treatment. Cellulose triacetate film, in which a thin cellulose diacetate layer is coat-provided on one surface or both surfaces, may be preferably employed.

Further, if desired, it is possible to apply the plasma treatment to the cellulose ester film which has been subjected to alkali saponification, and further, to enhance its adhesive properties. Alternatively, film, which has been subjected to plasma treatment, may be subjected to alkali saponification, and employed as the protective film for a polarizing plate.

On the other hand, by carrying out the plasma treatment instead of the alkali saponification, it is possible to enhance the adhesive properties without varying the degree of substitution (the degree of acetylation if a cellulose acetate based film is employed) on the surface of a cellulose ester film.

The surface of the protective film for the polarizing plate, which is adhered with a polarizer, is preferably subjected to plasma treatment prior to adhesion. Adhesion is preferably carried out within half a year after the plasma treatment, and is more preferably carried out within one month. Most preferably, the plasma treatment is carried out several hours or just before adhesion. Further, generally, effects due to the plasma treatment decrease during standing. However, it is discovered that washing improves the effects. Due to that, the protective film for the polarizing plate, which has been subjected to plasma treatment, is preferably immersed in water or warm water prior to adhesion.

Particularly improvement by washing is recognized in a film made of polyester such as polyethyleneterephthalate.

The protective film for the polarizing plate of the present invention may be comprised only of a base material, and may be comprised of said base material, an auxiliary layer and the like. Surface of the base material may be subjected to plasma treatment. After providing the auxiliary layer, its surface may be subjected to plasma treatment. The contact angle with respect to pure water on the base material surface may be below 55°. When an auxiliary layer is provided, the contact angle with respect to pure water on the auxiliary layer surface may also be below 55°.

The auxiliary layer is not particularly limited. However, a hydrophilic layer, an easily adhered layer, a fine particle containing layer, and the like are preferred. The thickness of said auxiliary layer, such as a hydrophilic layer and the like, is preferably between 0.05 and 1 μm, and is more preferably between 0.1 and 1 μm.

Further, after dying and stretching, a polarizer treated with boric acid and the like occasionally exhibits insufficient adhesive properties with adhesives comprised of water-soluble polymers such as polyvinyl alcohol and the like. In order to overcome such a problem, various investigations have been carried out. As a result, it has been discovered that after dying and stretching, a polarizer which has been treated with boric acid and the like is subjected to plasma treatment, and subsequently, by adhering the resulting polarizer with the protective film for the polarizing plate employing adhesives, adhesion of said polarizer with said protective film for the polarizing plate is markedly improved. Adhesives are preferably those comprised of water-soluble polymers such as polyvinyl alcohol and the like. Thus, it has become possible to enhance the adhesive force by activating the polarizer surface, which has been crosslinked, by boric acid treatment. More preferably, as described above, the protective film for the polarizing plate is also subjected to plasma treatment.

In addition, the adhesive properties have been further improved by adjusting the roughness of the film surface so as to obtain a central line average roughness Ra of 1 to 80 nm as well as maximum height differences of 5 to 80 nm. It is possible to achieve such roughness by carrying out the plasma treatment and to control the roughness by varying the treatment conditions. Based on the plasma treatment, it is possible to form unevenness having a larger cycle than saponification. Further, it is possible to obtain larger height difference, and thus to obtain the surface having an appropriate unevenness. The resulting unevenness is considered as one of the factors which improves adhesive properties.

The central line average roughness Ra was measured under a tapping mode, employing an inter-atomic force microscope, and at 10 optional places, the central line average roughness of a 0.5 μm straight line portion was obtained. In this measurement, a surface shape was measured under a dynamic mode (hereinafter referred to as DFM mode), employing a scanning type probe microscope SPI3800N multifunctional type unit SPA400 manufactured by Seiko Instruments. The employed cantilever was SI-DF20 (made of silicone, having a spring constant of 20.0 N/m, a torsion spring constant of 100.0 N/m, a resonance frequency of 120 to 150 Hz, a lever length of 200.0 μm, and a needle height of 3.00 μm). A sample was cut into about 1 cm cube, which was placed on the leveled sample stand on a piezo scanner, and a cantilever was allowed to approach the sample surface. When the cantilever reached a region in which an inter-atomic force works, scan was carried out in the X and Y directions, and the unevenness of the sample was captured by piezo displacement in the Z direction. The piezo scanner was employed which was capable of scanning X, Y 20 μm, and Z 2 μm. Scanning frequency was set at 1.00 Hz and a measurement area was set at 0.5×0.5 μm. The number of data for X and Y was 256 points, respectively. The obtained three-dimensional data were corrected employing the first order gradient correction.

The central line average roughness Ra is preferably between 1 and 80 nm in terms of 10-point average, and is most preferably between 2 and 80 nm. Further, the roughness Ra is preferably between 3 and 60 nm so that excellent adhesive properties are obtained. Further, the average of maximum height differences at 10 places in said length is preferably between 5 and 80 nm, is more preferably between 10 and 75 nm, and is further more preferably between 20 and 70 nm. When compared to the alkali saponification, Ra is larger, and the maximum height difference is also larger. Such differences markedly contribute to enhancement of the adhesive properties. By applying the plasma treatment to the protective film for the polarizing plate, it is possible to increase the number of hydroxyl groups, amino groups, carbonyl groups, carboxyl groups, and the like on said film. By so doing, wettability is improved by lowering the contact angle, and further the adhesive properties are effectively improved. Of groups, the hydroxyl group or the amino group exhibits major effects to enhance the adhesive properties. In order to increase the number of hydroxyl groups on the film surface, plasma treatment is preferably carried out in an ambience comprising water vapor or water, oxygen, and the like. In order to increase the number of amino groups, the plasma treatment is preferably carried out in an ambience comprising at least ammonia or nitrogen, or further, water vapor or hydrogen. It is possible to examine those through surface analysis, employing X-ray photoelectron spectroscopy.

After carrying out the plasma treatment under conditions in which the C—C bond or C—H bond of organic substances on the film surface is broken, the plasma treatment is preferably carried out under conditions in which hydroxyl groups or amino groups are formed on the film surface. By so doing, it is possible to introduce more hydroxyl groups or amino groups and to obtain the film which exhibits better adhesive properties. Specifically, the plasma treatment is preferably carried out in the presence of at least two types of gases selected from inert gases, such as argon, neon, and the like, hydrogen, oxygen, ozone, water vapor, carbon dioxide, carbon monoxide, nitrogen, ammonia, nitrogen monoxide, nitrogen dioxide, lower hydrocarbons such as methane, ethane, and the like, low boiling point organic compounds such as ketone, alcohol, and the like.

It is possible to readily provide the same adhesive properties as obtained by saponification by carrying out the plasma treatment in reactive gases comprised of at least one type of gas selected from inert gases such as argon, neon, and the kike, hydrogen, water vapor, hydrogen peroxide, and at least one type of gases selected from oxygen, water vapor, hydrogen peroxide, ozone.

Further, it was discovered that washing a plasma-treated film with water further enhanced the adhesive properties. Thus, in another embodiment of the present invention, it is possible to produce a polarizing plate by adhering a film which is subjected to plasma treatment, and subsequently to water washing or warm water washing. As described above, water washing may be carried out successively after the plasma treatment, or may be several hours to several months after the plasma treatment. The effects of the plasma treatment occasionally decrease during standing. However, since the effects are recovered by water washing, it is preferably carried out just prior to adhering.

Further, the present invention is to provide a recycling method for polarizing plates. Namely, cellulose acetate film, which is subjected to alkali saponification, is conventionally employed to produce polarizing plates. When the alkali saponification is applied, the ester bond on the surface is subjected to hydrolysis. In recent years, the reuse and recycling of source materials have been increasingly mandated. Regarding polarizing plates, it is desired that film be separated from crushed plates, scrap, defective plates, and recovered plates, and the separated film is then reused as a raw material for cellulose ester film. However, it has been found that when the conventional protective film employed for the polarizing plate is reused, foreign matter increases and the quality of recycled products is degraded. The causes have been investigated. As a result, it is assumed that the quality of recycled products is degraded due to inclusion of film in which esters on the surface of cellulose ester film, which has been subjected to alkali saponification, is hydrolyzed. Specifically, a cellulose ester film sample is placed between two polarizing plates and the polarizing plate is arranged in cross Nicol. Then when one surface of the fabricated sample is irradiated with light, light leaking spots (hereinafter referred to as luminescent spot foreign particles) is observed. The fewer the number of luminescent spot foreign particles, the more preferred. However, it has been found that the protective film, which is subjected to saponification, is reused as a raw material for cellulose ester, the number of said luminescent spot foreign particles tends to increase, and the quality of the polarizing plate is degraded.

Some luminescent spot foreign particles comprised in acetylated cotton employed as a raw material can be removed by filtration. However, it has been difficult to remove luminescent spot foreign particles by filtration which increase when cellulose ester film which is subjected to saponification is employed as a raw material. On the other hand, when the cellulose ester film is not subjected to saponification, its adhesive properties are insufficient. Due to that, problems occur during cutting or handling, in which the protective film for the polarizing plate peels off from the polarizer. Consequently, the reuse of said cellulose ester film has been diligently investigated. As a result, in another embodiment of the present invention, it has been revealed that cellulose ester film, which is specifically specified employing analytical results of the carbon bonding state on the surface of the protective film for the polarizing plate, is particularly preferable.

An XPS method (X-ray photoelectron spectroscopy) can be employed to investigate the bonding state of a carbon atom on the film surface and the presence as a functional group. In order to precisely obtain the difference in bonding state, it is preferred to employ a monochromatic Al X-ray source. Further, it is necessary to measure the bonding state under conditions in which when Ag 3d5/2 is measured employing a cleaned Ag plate, its half band width is no more than 0.60 eV.

Spectra, which are employed to calculate the intensity of a peak, should be subjected to sufficient integration so that of the three peaks of C1s, the intensity of the maximum peak exceeds 15,000 counts. Further, it is necessary to space measured energy at interval of 0.05 eV, and to sufficiently control the peak shapes. Further, in order to clarify the difference in peaks, it is necessary to control the energy resolution so that when the peak of Ag 3d5/2 is measured employing a cleaned Ag plate, the half band with is no more than 0.6 eV.

When the surface of the corresponding protective film for the polarizing plate is measured employing the XPS method, C1s is obtained as spectrum having three peaks. In order to assign these peaks, as reference, for example, "High Resolution XPS of Organic Polymer (The Scienta RSCA300 Database, G. Beamson and D. Briggs)", pages 164 and 165, and "APPENDIX X1."

When a peak of the lowest bond energy is designated as a first peak, a peak positioned at 1.60±0.3 eV in the higher bond energy side from the first peak is designated a second peak, and a peak positioned at 4.10±0.3 eV on the higher energy side from the first peak is designated as a third peak, each peak can be assigned as shown in Table 1.

| Peak | Bonding State |
|---|---|
| First Peak | C—H and C—C bond |
| Second Peak | C—OH, C*—O—C, and C*—O—V=O |
| Third Peak | C—O—C*=O, HO—(C*=O)— |

* expresses a subject carbon atom.

The bonding state of carbon atoms can be obtained by analyzing a C1s peak due to the carbon atom measured by the X ray photoelectron spectroscopy. Namely, in XPS, the bonding state of carbon is analyzed through the measurement of the energy of a photoelectron released from the 1s orbital of the carbon atom.

The ratio of bonding states can be obtained employing the intensity of each peak. The intensity of the peak as described herein represents count number obtained by connecting with a straight line points on the base line having the same bonding energy as the top from the top of each peak against the base line which is drawn between the energy value which is 3 eV lower in the lower bond energy side forms the first peak and one which is 3 ev higher in the higher energy side from the third peak, employing a Shirley method.

The first peak emerges at 1.6±0.3 eV on the lower energy side with respect to the second peak. However, when this part is not observed as a peak, the count number, obtained by connecting in a straight line between the intensity of the −1.6 eV part from the second peak and the aforementioned base line, is designated as the intensity of the first peak. The third peak emerges at 2.5±0.3 eV on the higher energy side from the second peak. When the peak is observed, in the same manner, the count number obtained by connecting in a straight line between the peak top and the base line is designated as the intensity of the peak. When the peak is not observed, the count number obtained by connecting in straight line between the intensity of +2.5 eV part on the higher energy side from the second peak and the aforementioned base line is designated as the intensity of the third peak.

On the surface and in the interior of the film, it has been confirmed that the more C—OH on the surface of the film, the better adhesion is obtained. Namely, in the of C1s peak analysis employing XPS, improvement of adhesion was observed by adjusting S–I specified by the following formula to at least 0.10. S–I is more preferably at least 0.15, and is still more preferably at least 0.20. S–I is preferably no more than 3.5, is more preferably no more than 2.5, and is still more preferably no more than 1.5. By satisfying such conditions, when cellulose ester is employed as a base material, it is possible to obtain a protective film for the polarizing plate which exhibits better recycling properties.

$$S-I \geq 0.1$$

wherein S is the intensity of the second peak on the surface (or base material surface) of the protective film for the polarizing plate/the intensity of the first peak on the surface (or base material surface) of the protective film for the polarizing plate, and I is the intensity of the second peak in the interior (the interior of the base material or the interior of the auxiliary layer) of the protective film for the polarizing plate/the intensity of the first peak of the interior (the interior of the base material or the interior of the auxiliary layer) of the protective film for the polarizing plate.

The interior of the base material as described herein means a place having an optimal depth in the range of 0.05 to 1 μm (preferably 0.2 to 1 μm) from the base material surface. Further, the interior of the auxiliary layer as described herein means a place having an optimal depth in the range of 0.05 to 1 μm from the surface thereof.

Said S is preferably at least 1.20, is more preferably at least 1.60 to obtain improved adhesion, and is still further preferably at least 1.70. It is most preferably at least 1.80 to obtain most improved adhesion.

Further, the ratio of relative intensity of C1s peak, which is expressed by T, that is, the third peak intensity of the surface (or the base material surface) of the protective film for the polarizing plate/the second peak intensity of the surface (or the base material surface) of the protective film for the polarizing plate, is preferably at least 2.0, is more preferably at least 0.4, and is most preferably at least 0.6. When such cellulose ester is employed, it has been found that the luminescent spot foreign particles preferably decrease.

Further, it is preferable to satisfy the following formula.

$$T-U>0$$

wherein U is the intensity of the third peak in the interior of 10 μm from the base material surface/the intensity of the second peak in the interior of 10 μm from the base material surface.

The film surface as described herein means a region having a depth of about 200 angstrom form the surface, which is measured by XPS. The interior means the region which is more than said depth from the surface. In order to measure the interior, the region having a thickness of more than said depth is shaved off, and a newly exposed surface can be measured.

It is preferable that the number of hydroxyl groups, which bond to a carbon atom on the base material surface or in the surface of the auxiliary layer, is more than that the number of hydroxyl groups which bond to a carbon atom in the interior of the base material or the auxiliary layer. It is also preferable that the number of amino groups, which bond to a carbon atom on the base material surface or the interior of the auxiliary layer, is more than the number of amino groups which bond to a carbon atom in the interior of the base material or the auxiliary layer. Furthermore, it is preferable that the total number of hydroxyl groups and amino groups, which bond to a carbon atom on the base material surface or the interior of the auxiliary layer, is more than that the total number of hydroxyl groups and amino groups which bond to a carbon atom in the interior of the base material or the auxiliary layer.

Specifically, such cellulose ester film is obtained employing the plasma treatment instead of the saponification. Namely, the plasma treatment hardly varies the degree of substitution of esters on the surface. Namely when the plasma treatment is applied, the degree of ester substitution is hardly varied. Thus, it has become possible to preferably reuse scrap as well as cut waste of cellulose ester film, which has been subjected to plasma treatment instead of saponification, and scrap and waste of cellulose ester film separated from polarizing plates using the same, as the raw material of cellulose ester film.

Accordingly, based on said method, it is possible to reuse as a raw material the cellulose ester film which has been subjected to plasma treatment and to produce recycled cellulose ester film. If desired, cellulose ester powder as a raw material and cellulose ester film, which has been subjected to plasma treatment, may be blended in an optional ratio and employed. At that time, a small amount of cellulose ester film, which has been subjected to saponification, may be blended with a raw material. However, it is preferable that no cellulose ester film, which has been subjected to saponification, is contained.

The recycled cellulose ester film, as described above, may preferably employed not only as the protective film for the polarizing plate but also as films for other optical use or supports for photosensitive materials.

Cellulose ester film according to the present invention is preferably comprised of cellulose esters which are lower fatty acid esters. The lower fatty acid in the lower fatty acid ester of the cellulose ester as described herein means a fatty acid having from 1 to 5 carbon atoms. Cited as examples of preferable lower fatty acid esters are cellulose diacetate, cellulose triacetate, cellulose propionate, cellulose butyrate, and the like. These may be employed in combination of two types or more.

Further, other than those described above, mixed fatty acid esters such as cellulose acetate propionate, cellulose acetate butyrate, and the like may be employed, which are described in Japanese Patent Publication Open to Public Inspection Nos. 10-45804, and 08-231761, and U.S. Pat. No. 2,319,052, and others.

These cellulose esters may be employed individually or in combination.

Of these described above, lower fatty acid esters of cellulose which are most preferably employed include cellulose triacetate, cellulose propionate or mixtures thereof.

Further, from the viewpoint of base strength, those particularly having a degree of polymerization of 250 to 400 as well as a combined acetic acid amount of 54 to 62.5 percent are preferably employed. Cellulose triacetate having a combined acetic acid amount of 58 to 62.5 percent is more preferably employed.

There are two types of cellulose triacetate, i.e. cellulose triacetate made from linter and cellulose triacetate made from wood pulp. These are preferably employed individually or in combination. When problems with peeling properties from a belt as well as a drum occur, the ratio of the cellulose triacetate made from linter, which exhibits good peeling properties, may preferably be increased so that the productivity increases.

When cellulose triacetate made from wood pulp is blended with cellulose triacetate made from linter and employed, the ratio of said cellulose triacetate is preferably at least 40 percent by weight so as to obtain marked effects to improve peeling properties, is more preferably at least 60 percent by weight, is still more preferably at least 85 percent by weight, and is most preferably 100 percent by weight.

In order to improve slipping properties, fine particles may be incorporated into the protective film for the polarizing plate of the present invention. Listed as fine particles are inorganic compounds or organic compounds.

Preferred as inorganic compounds are silicon-containing compounds, silicon dioxide, aluminum oxide, zirconium oxide, calcium carbonate, talc, sintered kaolin, sintered calcium silicate, hydrated calcium silicate, aluminum silicate, magnesium silicate, calcium phosphate, and the like. Of these, inorganic silicon-containing compounds and zirconium oxide are more preferred. Silicon dioxide is most preferably employed because the turbidity of cellulose ester film can be reduced.

Employed as fine particles of silicon dioxide may be, for example, commercially available products having a trade name such as Aerosil R972, R974, R812, 200, 300, R202, OX50, and TT600 (these are manufactured by Nihon Aerosil Co., Ltd.).

Employed as fine zirconium oxide particles may be, for example, commercially available products having a trade name such as Aerosil R976 and R811 (these are manufactured by Nihon Aerosil Co., Ltd).

Preferably employed as organic compounds may be, for example, polymers such as silicone resins, fluorine resins, acrylic resins, and the like. Of these, silicone resins are preferably employed.

Of silicone resins described above, those having a three-dimensional structure are preferred. Commercially available products having a trade name of Tospearl 103, same 105, same 108, same 120, same 145, same 3120 and same 240 (these are manufactured by Toshiba Silicone Co., Ltd.) may be employed.

From the viewpoint to control haze to the lower level, the average primary particle diameter of fine particles is preferably no more than 20 nm, is more preferably between 5 and 16 nm, and is most preferably between 5 and 12 nm.

The average primary particle diameter of fine particles was measured as follows: 100 particles were observed employing an emission type electron microscope (at a magnifying factor of 500,000 to 200,000,000), and the resulting average value was denoted as the average primary particle diameter.

The apparent specific gravity of fine particles is preferably at least 70 g/liter, is more preferably between 90 and 200 g/liter, and is most preferably between 100 and 200 g/liter. When the apparent specific gravity increases, it is possible to prepare a dispersion having a higher concentration. Thus the haze as well as coagula is preferably decreased.

Fine silicon dioxide particles, having an average primary particle diameter of no more than 20 nm as well as an apparent specific gravity of at least 70 g/liter, is obtained, for example, by combusting a mixture consisting of vaporized silicon tetrachloride and hydrogen at 1,000 to 1,200.degree. C. in air. Further, products having a trade name of Aerosil 200V and Aerosil R972V (these are manufactured by Nihon Aerosil Co., Ltd.) may be employed, which are available on the market.

In the present invention, the apparent specific gravity described above was calculated by the formula described below, while a definite amount of fine silicon dioxide particles were placed in a measuring cylinder and then the resulting weight was measured.

Apparent specific gravity (in g/liter)=(weight of silicon dioxide (in g)/volume of silicon dioxide (in liter)

Listed as methods to prepare fine particle dispersions are the three types described below:

(Preparation Method A)

After blending while stirring a solvent with fine particles, the resulting mixture is subjected to dispersion employing a homogenizer. The resulting dispersion is designated as a fine particle dispersion. Said fine particle dispersion is added to a dope and stirred.

(Preparation Method B)

After blending with stirring a solvent with fine particles, the resulting mixture is subjected to dispersion employing a homogenizer. The resulting dispersion is designated as a fine particle dispersion. Separately, a small amount of cellulose acetate is added to a solvent, mixed and dissolved. Said fine particle dispersion is added to the resulting cellulose acetate solution and stirred. The mixture is designated as a fine particle addition composition. Said fine particle addition composition is well mixed with a dope employing a in-line mixer.

(Preparation Method C)

A small amount of cellulose acetate is added to a solvent, stirred, and dissolved. Fine particles are added to the resulting cellulose acetate solution and dispersed employing a homogenizer. The resulting dispersion is designated as a fine particle addition composition. The resulting fine particle addition composition is well mixed with a dope employing an in-line mixer.

Preparation Method A is excellent in efficient dispersion of fine silicon dioxide particles, and Preparation Method C is excellent in minimization of re-coagulation of fine silicon dioxide particles. Preparation Method B is excellent in both efficient dispersion of fine silicon dioxide particles as well as minimization of re-coagulation of fine silicon oxide particles, and thus is a preferable preparation method.

(Dispersion Method)

When fine silicon dioxide particles are mixed with solvents and the like and dispersed, the concentration of said silicon dioxide is preferably between 5 and 30 percent by weight, is more preferably between 10 and 20 percent by weight, and is most preferably between 15 and 20 percent by weight. When the dispersion concentration increases, the turbidity with respect to the added amount tends to decrease. Thus such increase is preferred to decrease the haze as well as the coagula.

Listed as employed solvents are lower alcohols, preferably such as methyl alcohol, ethyl alcohol, propyl alcohol, isopropyl alcohol, butyl alcohol, and the like. As solvents other than lower alcohols, solvents, which are employed for casting cellulose esters, are preferably employed.

The added amount of fine silicon dioxide particles with respect to cellulose ester is preferably between 0.01 and 0.3 weight part per 100 weight parts of cellulose ester, is more preferably between 0.05 and 0.3 weight part, and is most preferably between 0.08 and 0.12 weight part. When the added amount is larger, dynamic friction coefficient is improved, while the added amount is less, the haze as well as coagula decreases.

Ordinary homogenizers may be employed. Homogenizers are mainly divided into two types; a media homogenizer and a medialess homogenizer. Fine silicon dioxide particles are preferably dispersed by the medialess homogenizer which results in decrease in haze.

Cited as medialess homogenizers are a ball mill, a sand mill, a dyno mill, and the like.

As medialess homogenizers, there are an ultrasonic type, a centrifugal type, a high pressure type, and the like. In the present invention, the high pressure type homogenizer is preferred. The high pressure homogenizer is an device which generates special conditions such as high shearing, high pressure, and the like by passing a composition prepared by mixing fine particles with solvents into a narrow pipe at a high speed. For example, in a narrow pipe having a diameter of 1 to 2,000 µm, the maximum pressure in the interior of a device is preferably at least 9.8 Mpa. Further, at the time, a device that allows a maximum attainable speed to exceed 100 m/second, as well as heat transfer rate to exceed 420 kJ/hour is preferred.

Ultra-high pressure homogenizers as described above include an ultra-high pressure homogenizer (with a trade name of Microfluidizer) manufactured by Microfluidics Corporation, and Nanomizer manufactured by Nanomizer Co.

Listed as devices other than those are Manton-Gaulin type high pressure homogenizer, for example, Homogenizer manufactured by Izumi Food Machinery, UHN-01 manufactured by Sanwa Kikai Co., Ltd., and the like.

In the protective film of the present invention, an auxiliary layer may be provided on a base body. Said auxiliary layer comprises a layer containing fine particles, a layer containing hydrophilic high molecular compounds, an readily adhesive layer, and the like. Further, in order to improve the slipping properties, it is preferable that a layer comprising fine particles according to the present invention is cast so as to come in direct contact with a casting support.

UV absorbers, which relate to the cellulose ester film of the present invention, will be described.

The cellulose ester film of the present invention exhibits high dimensional stability. Therefore, it is employed in polarizing plates, liquid crystal display members, and the like. From the viewpoint to prevent degradation of said polarizing plates, liquid crystals, and the like, UV absorbers are preferably employed.

Preferably employed as UV absorbers are those, which well absorb ultraviolet rays having a wavelength of no longer than 370 nm and absorb minimal visible light having a wavelength of no shorter than 400 nm.

Listed as specific examples preferably employed in the present invention are oxybenzophenone based compounds, benzotriazole based compounds, salicylic ester based compounds, benzophenone based compounds, cyano acrylate based compounds, nickel complex based compounds, and the like.

As benzotriazole based UV absorbers, the compounds represented by the following general formula (I) are preferably employed.

wherein $R_1$, $R_2$, $R_3$, $R_4$, and $R_5$ may be the same or different, and each represents a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, a mono- or dialkylamino group, an acylamino group, a 5- or 6-membered heterocyclic group, and $R_4$ and $R_5$ may form 5- or 6-membered carbon ring by closing a ring.

Specific examples of UV absorbers represented by the general formula (I) are shown below:
UV-1: 2-(2'-hydroxy-5'-methylphenyl)benzotriazole
UV-2: 2-(2'-hydroxy-3', 5'-di-tert-butylphenyl)benzotriazole
UV:3: 2-(2'-hydroxy-3'-tert-butyl-5'-methylphenyl)benzotriazole
UV-4: 2-(2'-hydroxy-3', 5'-di-tert-butylphenyl)-5-chlorobenzotriazole
UV-5: 2-(2'-hydroxy-3'-(3" 4",5",6"-tetrahydrophthalimidomethyl)-5'-methylphenyl)benzotriazole
UV-6: 2,2-methylenebis(4-(1,1,3,3-tetramethylbutyl)-6-(2H-benzotriazole-2-yl)phenol)
UV-7: 2-(2'hydroxy-3'-tert-butyl-5'-methylphenyl)-5-chlorobenzotriazole Further, preferably employed as benzophenone based UV absorbers, which are one type of UV absorbers related to the present invention, are compounds represented by the general formula (II):

wherein Y represents a hydrogen atom, a halogen atom, an alkyl group, an alkenyl group, an alkoxy group, and a phenyl group which may have a substituent, A represents a hydrogen atom, an alkyl group, an alkenyl group, a phenyl group, a cycloalkyl group, an alkylcarbonyl group, an alkenylsulfonyl group, or —CO (NH)$_{n-1}$—D group, wherein D represents an alkyl group, an alkenyl group, or a substituted or unsubstituted phenyl group, and m and n each represents 1 or 2.

In foregoing, the alkyl group is for example, a straight or branched aliphatic group having from 1 to 24 carbon atoms, the alkoxy group is, for example, an alkoxy group having from 1 to 18 carbon atoms, the alkenyl group is, for example, an alkenyl group having from 1 to 16 carbon atoms, and represents an allyl group, a 2-butenyl group, and the like. Listed as substituents on an alkyl group, an alkenyl group, a phenyl group are a halogen atom such as a chlorine atom, a bromine atom, a fluorine atom, a hydroxyl group, a phenyl group (this phenyl group may be substituted with an alkyl group, a halogen atom, and the like).

Specific examples of benzophenone based compounds represented by the general formula (II) are shown below:
UV-8: 2,4-dihydroxybenzophenone
UV-9: 2,2'-dihydroxy-4-methoxybenzophenone
UV-10: 2-hydroxy-4-methoxy-5-sulfobenzophenone
UV-11: bis(2-methoxy-4-hydroxy-5-benzoylphenylmethane UV absorbers, described in Japanese Patent Publication Open to Public Inspection No. 6-148430, may also be preferably employed.

UV absorbers described above., which are preferably employed in the present invention, exhibit excellent transparency, as well as excellent effects to minimize the degradation of polarizing plates as well as liquid crystal elements. Of them, benzotriazole based UV absorbers are preferred which specifically have minimal unnecessary tint. Addition methods of the addition composition comprising these UV absorbers include the following:

(Addition Method A)

A UV absorber addition composition is prepared by dissolving UV absorbers in an organic solvent such as alcohol, methylene chloride, dioxolane, and the like. the resulting solution is directly added to a dope composition.

(Addition Method B)

A UV absorber addition composition is prepared by dissolving UV absorbers together with a small amount of cellulose ester in an organic solvent such as alcohol, methylene chloride, dioxolane, and the like. The resulting solution is added to a dope employing an in-line mixer.

Addition Method B is more preferred because the addition amount of UV absorbers can readily be controlled, and thus productivity is enhanced.

The employed amount of UV absorbers varies depending on the type of compounds, employed conditions, and the like. However, said amount is preferably between 0.2 and 5.0 g per m$^2$ of cellulose ester film, is more preferably between 0.4 and 1.5 g, and is most preferably between 0.6 and 1.0 g.

The thickness of the cellulose ester film of the present invention will now be described.

When the total thickness of cellulose ester film is excessively small, toughness as the protective layer for the polarizing plate becomes inefficient to degrade the dimensional stability of the polarizing plate as well as the keeping stability thereof against moisture and heat. When the thickness is excessively large, the polarizing plate becomes thicker, and it is difficult to reduce the thickness of a liquid crystal display. The thickness of the layer of cellulose ester laminated film, which overcomes those problems is between 20 and 200 µm, is preferably between 30 and 100 µm, and is more preferably between 40 and 80 µm.

The production method of cellulose eater film will be described.

In order to produce cellulose ester film, the following method is employed: first, cellulose ester is dissolved in a solvent and a dope is prepared, and the resulting dope is cast on an endless belt, peeled off, and subsequently dried.

The dope, in which cellulose ester is dissolved, is in a state in which said cellulose is dissolved in a solvent. Additives such as plasticizers and the like may be incorporated into said dope. Needless to say, if required, other additives may be incorporated. The concentration of cellulose ester in said dope is preferably between 10 and 30 percent by weight, and is more preferably between 18 and 25 percent by weight.

Solvents in the present invention may be employed individually or in combination. However, from the viewpoint of production efficiency, it is preferable that good solvents and bad solvents are mixed and employed. The mixing ratio of the good solvent to the bad solvent is preferably between 70 and 95 percent by weight, while said ratio of the bad solvent to the good solvent is preferably between 5 and 30 percent by weight.

Good solvents and bad solvents which are employed in the present invention are defined as follows: the solvent itself, which dissolves employed cellulose ester, is a good solvent, while the solvent itself which neither swells nor dissolves said cellulose ester is a bad solvent. Due to that, depending on the amount of acetic acid which is combined with cellulose ester, a bad solvent varies to a good solvent. For example, when acetone is employed as the solvent, it is a good solvent for cellulose ester in which the amount of combined acetic acid is 55 percent, while it is a bad solvent for cellulose ester in which the amount of combined acetic acid is 60 percent.

Listed as good solvents employed in the present invention are organic halogen compounds such as methylene chloride and the like and dioxolanes.

Further, preferably employed as bad solvents employed in the present invention are, for example, methanol, ethanol, n-butanol, cyclohexane, and the like.

When the aforementioned dope is prepared, a common method may be employed to dissolve cellulose ester. A preferred method is such that said cellulose ester is mixed with bad solvents so that it is damped and swelled, and further mixed with good solvents. At the time, the resulting mixture is preferably heated under increased pressure in the range of temperature at which solvents boil at normal temperature and do not boil, and said cellulose ester is dissolved while stirring in order to minimize the formation of gel as well as insoluble coagula.

Pressure may be raised by introducing inert gases such as nitrogen gas, or by the increase in vapor pressure by heating. Heating is preferably carried out from the exterior. For example, a jacket type is preferred, since the temperature is readily controlled.

Further, a dope is preferably employed which is prepared by employing a freeze dissolution method in which without employing halogen based solvents, cellulose esters such as cellulose triacetate and the like are cooled below −20° C. together with methyl acetate and/or solvent such as acetone, methyl acetate and ethanol, and the like and thereafter, are heated.

In the present invention, during preparation of said dope, scrap and the like of cellulose ester, which has been subjected to plasma treatment, may be employed as the raw material of cellulose ester or a part of said raw material.

When solvents are added, heating temperature is set in the range of the lower temperature than the boiling point of the employed solvent to the temperature at which said solvent does not boil, and is preferably set, for example, in the range of 60 or 70 to 110° C. Further, the pressure is controlled so that said solvent does not boil at a set temperature. The solvent can be controlled not to boil at temperature higher than the boiling point under normal pressure by adding higher pressure.

After cellulose ester is dissolved, the dissolved cellulose ester is removed from the vessel or is removed from the vessel employing a pump and cooled employing a heat exchanger, and employed for casting. At the time, said dissolved cellulose ester may be cooled to normal temperature. However, when it is cooled to the temperature at 5 to 10° C. lower than the boiling point of the solvent, and is preferably subjected to casting without varying the temperature so that the viscosity of the dope can be decreased.

During a casting process, a belt-shaped support or a drum-shaped support having a secular finished stainless steel surface is preferably employed. Casting may be carried out on the support maintained at the common temperature range of 0° C. to below the boiling point of the employed solvent. However, casting is preferably carried out on the support which is maintained at 0 to 35° C. so that the dope is gelled and the peel limit time can be shortened. The casting is more preferably carried out on the support maintained at 5 to 20° C. The peel limit time as described herein means a time of the cast dope on the support in the limit of the casting speed which makes it possible to continually obtain a transparent film with excellent flatness. The shorter peel limit time is preferred so that productivity is enhanced.

The temperature of the support surface, on which the dope is cast, is between 10 and 55° C., and the temperature of the dope is between 25 and 60° C. Further, the temperature of the dope is preferably higher than the support, and is more preferably at least 5° C. higher. The temperature of the dope as well as the support is preferably as high as possible to increase the vaporization rate of solvents. However, when it is excessively high, occasionally air bubbles are generated and the flatness is degraded.

The temperature of the support is more preferably in the range of 20 to 40° C., and the temperature of the dope is more preferably in the range of 35 to 45° C.

Further, the support temperature of the peeling section is preferably between 10 and 40° C., and is more preferably between 15 and 30° C. so that adhesive force between the film and support can be decreased to be readily peeled off.

In order to obtain excellent flatness of cellulose ester film during production, the amount of residual solvents at peeling is preferably between 10 and 100 percent, is more preferably between 20 and 40 percent or between 60 to 80 percent, and is most preferably between 20 and 30 percent.

In the present invention, the amount of residual solvent is defined by the following formula:

Amount of residual solvent (in %)=(weight prior to heating process−weight after heating process)/ (weight after heating process)×100

Further, the heating process during measurement of the amount of the residual solvent means a heating process in which a film is heated at 115° C. for one hour.

Peeling tension during peeling of a film from a support is commonly between 200 and 250 M/m. However, when the cellulose ester film which comprises a higher content of UV absorbers per unit weight of the cellulose ester and has a less thickness than conventional one, wrinkling tends to result during peeling. Therefore, peeling is preferably carried out at the lowest tension of 170 N/m, and is more preferably carried out at the lowest tension of 140 N/m at which the film is capable of being peeled.

Further, in the drying process of cellulose ester film, the film peeled from the support is further dried. At that time, the residual solvent content is preferably reduced to no more than 3 percent by weight and is more preferably reduced to no more than 0.5 percent by weight.

In the drying process, film is preferably dried, while commonly conveying said film employing a roll loft method or a pin tenter method. For a liquid crystal display member, a film is preferably dried while maintaining the width employing the pin tenter method so that the dimensional stability is improved. Maintaining the width immediately after peeling from the support, while the residual solvent content is high, is particularly preferred because the improvement effect of dimensional stability is further exhibited. Film drying means are not particularly limited, and generally drying is carried out employing heated air flow, infrared rays, heated rolls, microwave, and the like. Heated airflow is preferably employed due to its convenience. Drying temperatures are suggested to be in the range 40 to 150° C., and drying is preferably carried out while dividing the temperature to 3 to 5 levels which are gradually raised. Drying is more preferably carried out in the range of 80 to 140° C. so that the dimensional stability is enhanced.

Further, if desired, cellulose ester film, having a laminated structure, may also be employed, which is prepared by co-casting a plurality of doping materials.

The co-casting as described herein includes a successive multilayer casting method in which two or three layers are formed through different dies, a simultaneous multilayer casting method in which two or three layers are formed by combining layers in a die having two or three slits, a successive casting method, and the like. Of these, the simultaneous multilayer casting method is preferred due to its high productivity. Examples of production of laminated film employing the co-casting are, for example, described in Japanese Patent Publication Open to Public Inspection Nos. 10-235664 and 11-216732.

Plasticizers are preferably incorporated into the cellulose ester film of the present invention. Employable plasticizers include phosphoric acid esters such as triphenyl phosphate, tricresyl phosphate, cresyl diphenyl phosphate, octyl diphenyl phosphate, diphenyl biphenyl phosphate, trioctyl phosphate, tributyl phosphate, and the like; phthalic acid esters such as diethyl phthalate, dimetoxyethyl phthalate, dimethyl phthalate, dioctyl phthalate, dibutyl phthalate, di-2-ethylhexyl phthalate, and the like; glycolic acid esters such as triacetin, tributin, butylphtharylbutyl glycolate, ehtylphtharylethyl glycolate, methylphtharylethyl glucolate, butylphtharylbutyl glucolate, and the like. These may be employed individually or in combination. A phosphoric acid based plasticizer is most preferably employed together with a plasticizer having a solidifying point of no more than 20° C. to improve dimensional stability as well as water resistance. Plasticizers having a solidifying point of no more than 20° C. can be selected from those listed above which have a solidifying point of no more than 20° C. Specifically listed are tricresyl phosphate, cresyldiphenyl phosphate, tributyl phosphate, diethyl phthalate, dimethyl phthalate, dioctyl phthalate, dibutyl phthalate, di-2-ethylhexyl phthalate, triacetin, ethylphtharylethyl glycolate, and the like. These plasticizers may be employed individually or in combination.

The solidifying point as described herein means a true solidifying point as described in "Kagaku Daijiten (Chemical Encyclopedia)" published by Kyoritsu Shuppan Co., Ltd.

These plasticizers may be added up to about 30 per cent by weight with respect to cellulose ester, depending on film performance, machininability, and the like. However, the added amount is preferably between 1 and 15 percent by weight. For the member of the liquid crystal display, the added amount is preferably between 5 and 15 percent by weight from the viewpoint of dimensional stability, and is most preferably between 7 and 12 percent by weight. Further, the content of plasticizers having a solidifying point of no more than 20° C. is preferably between 1 and 10 percent by weight with respect to cellulose ester, and is more preferably between 3 and 7 percent by weight.

A larger ratio of plasticizers having a solidifying point of no more than 20° C. to the total plasticizers is preferred, since the flexibility as well as machinability of cellulose ester film is improved. Further, plasticizers are most preferably comprised of those having a solidifying point of no more than 20° C.

The average content of plasticizers within the range of 10 μm from the surface, which is subjected to plasma treatment, is preferably less in terms of adhesive properties. Said content with respect to the average content of plasticizers in the entire film is preferably no more than 3/4, and is most preferably between 1/10 and 3/4.

Listed as the plasma treatment employed in the present invention are a vacuum glow discharge, an atmospheric pressure glow discharge, and the like. A flame plasma treatment and the like are listed as other methods. For these, employed may be methods described, for example, in Japanese Patent Publication Open to Public Inspection Nos. 6-123062, 11-293011, 11-5857 and others.

By employing the plasma treatment, it is possible to provide strong hydrophilicity to the surface of plastic which is placed in plasma. For example, in a plasma generating apparatus employing the aforementioned glow discharge, a film to be subjected to hydrophilicity is placed between facing electrodes, and plasma excitation gas is introduced into said apparatus. Then by applying high frequency voltage to both electrodes, it is possible to carry out surface treatment by plasma excitation said gas and generating a glow discharge between said electrodes. Of these, the plasma treatment employing the atmospheric pressure glow discharge is preferably employed.

The plasma excitation gas as described herein means a gas which is subjected to plasma excitation in the aforementioned conditions, and includes argon, helium, neon, krypton, xenon nitrogen, carbon dioxide, flons such as tetrafluoromethane, and mixtures thereof.

A mixture of inert gas such as argon, neon, and the like with a reactive gas, which is capable of providing a polar functional group such as a carboxyl group, a hydroxyl group, a carbonyl group, and the like onto the plastic surface, is employed as the excitation gas. Other than hydrogen, oxygen, and nitrogen, if required, employed as reactive gases may be gases such as water vapor, ammonia, and the like, and further low boiling point organic compounds such as lower hydrocarbons, ketones, and the like. However, due to ease of handling, hydrogen, oxygen, carbon dioxide, nitrogen, water vapor and the like are preferred. When water vapor is employed, gas, which is bubbled in water, may be employed. Alternatively, a gas may be mixed with water vapor.

The employed frequency of applied high frequency voltage is preferably between 1 and 100 kHz, and is more preferably between 1 and 10 kHz.

There are two methods of the plasma treatment employing the glow discharge; one in a vacuum and the other under atmospheric pressure.

In the vacuum plasma discharge treatment employing the glow discharge, in order to effectively generate said discharge, it is required to introduce the aforementioned reactive gas so as to maintain the ambient pressure in the range of 0.005 to 20 torr. In order to increase the treatment rate, it is preferred to employ high output conditions on the high pressure side. However, when the electric field strength is excessively increased, the base material occasionally suffers from damage.

When the atmospheric pressure glow discharge, which carries out the plasma discharge at the pressure near atmospheric pressure, is employed, in order to generate a stable discharge, inert gases such as helium, argon, and the like are required. Thus, when the aforementioned excitation gases contain inert gases in an amount of at least 60 percent, stable discharge is generated. However, when the ratio of the inert gases is excessively high and the ratio of the reactive gases is low, the treatment rate decreases. When the electric field strength is excessively increased, damage to the base material occasionally results.

Further, when the plasma treatment is carried out at pressure near atmospheric pressure, said inert gases are not always required to generate pulsed electrochemical plasma. Accordingly, it is possible to increase the concentration of the reactive gases to increase the reaction rate.

In the flame plasma treatment, the plasma is generated by carrying out a flame treatment on the surface of the film to be subjected to surface treatment, and the surface treatment is carried out employing the resultant plasma. For example combustion gasses such as paraffin based gases city gas, natural gas, methane gas, propane gas, butane gas, and the like) are mixed with oxidizing gases such as air and oxygen (or combustion aids, oxidizing agents and the like are occasionally employed). The resulting mixture is combusted and the surface is subjected to treatment employing the resulting flame.

Generally, a flame generated from a burner is composed of an inner flame and an exterior flame. The exterior flame is a part composed of the gas of the inner flame which is not combusted and heated, and commonly is pale blue. Thus the exterior flame is a so-called blue gas flame, and a part having a relatively high temperature. The part of the flame which is not blue is the inner flame and has a relatively low temperature due to the low supply of oxygen.

Within 30 mm from the top of the inner flame, a large amount of plasma is generated. As described in Japanese Patent Publication Open to Public Inspection No. 11-184042, by regulating the flame using a shielding plate, it is possible to treat a base material surface employing the flame which is limited from the top to 30 mm. Accordingly, by employing such a flame, it is possible to carry out the plasma treatment.

The duration of flame application is between 0.001 and 2 seconds, while the flame is brought into contact with the base material to be treated. The duration is preferably between 0.01 and 1 second. When the time is excessively long, the surface is subjected to excessive treatment, while when the time is shorter, only slight oxidation reaction occurs and the adhesive properties are not improved.

The burner, which is employed for this purpose, is not particularly limited as long as it is capable of providing a uniform flame on the base material surface to be treated. Further, a plurality of burners may be arranged.

The mixing ratio of the combustion gas to the oxidizing gas employed in the aforementioned flame treatment varies depending on the type of gases. For example, in the case of propane gas and air, the volume ratio is preferably in the range of 1/15 to 1/22, and is more preferably in the range of 1/16 to 1/19. In the case of natural gas and air, the volume ratio is preferably in the range of 1/6 to 1/10, and is more preferably in the range of 1/7 to 1/9. The size ratio of the inner flame to the exterior flame varies depending on the types of combustion gases, the types of oxidizing gases, the mixing ratio, the supplying rate, and the like.

Figure 2:
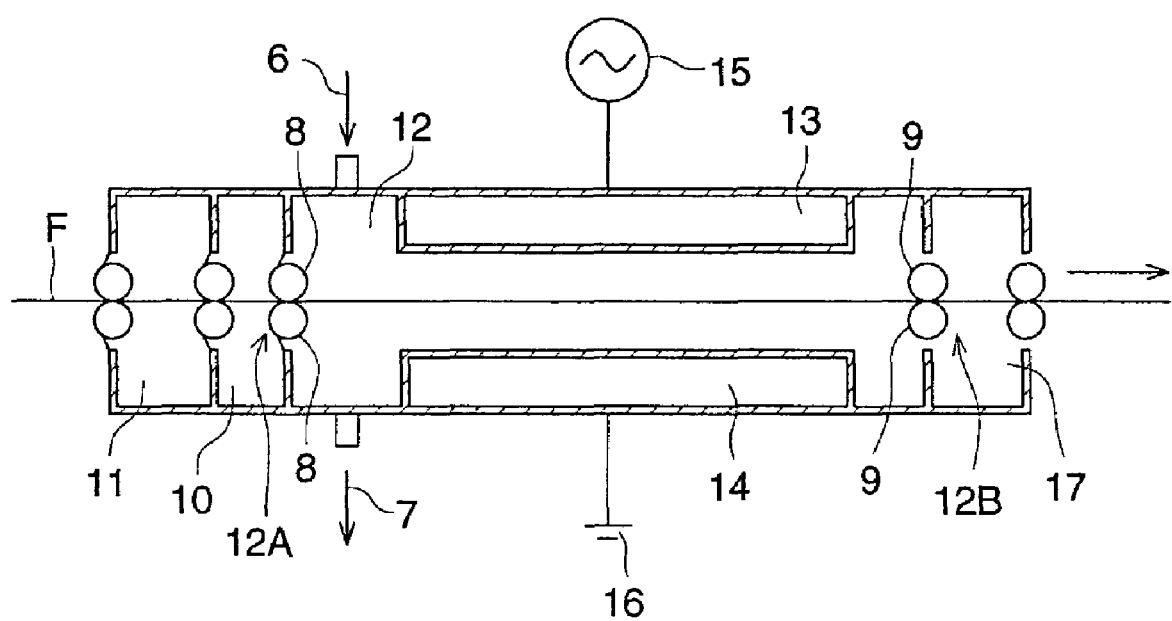
FIG. 2 is a cross-sectional view showing one example of an apparatus which carries out continuous vacuum plasma treatment.

In FIG. 1, an atmospheric plasma treatment apparatus is shown as an example of a plasma treatment apparatus. In FIG. 2, an apparatus is shown in which a continuous vacuum plasma treatment is carried out.

FIG. 1 is a cross-sectional view showing an example of an atmospheric pressure plasma treatment apparatus. Namely, in the atmospheric pressure plasma generating apparatus in FIG. 1, between two facing electrodes (upper and lower electrodes are represented by reference numeral 1), sample 2 is placed which is to be subjected to plasma treatment. In order to prevent spark discharge during plasma excitation, dielectric 3 such as glass, ceramics, and polyimide film is preferably provided on the surface of said upper and/or lower electrode. A plasma excitation gas such as a gas mixture of argon and helium is introduced into the atmospheric pressure plasma generating apparatus from inlet 4, and replaces the inner air and is then ejected from an outlet. Subsequently, high frequency voltage, for example, 3000 Hz and 4,200 V is applied to the electrodes, said introduced gas is subjected to plasma excitation, and a glow discharge is generated for a specified time. Thus, the sample surface is subjected to modification.

FIG. 2 is a cross-sectional view showing an example of an apparatus in which vacuum plasma treatment is continually carried out. The treatment section which continually applies in vacuum plasma treatment to a long roll of film, which is continually conveyed, is constituted by partitioned treatment chamber 12, having inlet 12A and outlet 12B for sample film F.

In the treatment chamber 12, facing electrodes 13 and 14 are provided. Of these paired electrodes 13 and 14, the electrode 13 is connected to high frequency power source 15, and the other electrode 15 is grounded employing grounding cable 16. It is constituted so that an electric field can be applied in the gap of paired electrodes 13 and 14.

Further, treatment gas is introduced from flow inlet 6 and air in the treatment chamber is removed from flow outlet 7 employing an exhaust pump.

In the example in FIG. 2, pressure-reduced supplementary chambers 10 and 11 are provided adjacent to the treatment chamber 12 on the film inlet side . On the film outlet side, pressure-reduced supplementary chamber 17 is provided. Further these are partitioned by nip rolls 8 and 9. Further, herein, 15 represents a high frequency power source.

When pressure-reduced supplementary chambers are provided, as shown in FIG. 2, 2 chambers on the film F inlet side and one chamber on the outlet side may be provided. Embodiments may be considered in which one chamber is provided on the film F inlet side and one chamber on the outlet side are provided, and two chambers on the film F inlet side and two chambers on the outlet side are provided.

Further, an apparatus which carries out flame plasma treatment, which is described in Japanese Patent Publication Open to Public Inspection No. 9-355097 is preferably employed.

Generally, a flame generated by a burner is composed of an inner flame and an exterior flame. The exterior flame is a part composed of the gas of the inner flame which is not combusted and heated, and commonly is pale blue. Thus the exterior flame is a so-called blue gas flame, and has a relatively high temperature. The part of the flame, which is not blue, is the inner flame and has a relatively low temperature due to the lower supply of oxygen.

Figure 3:
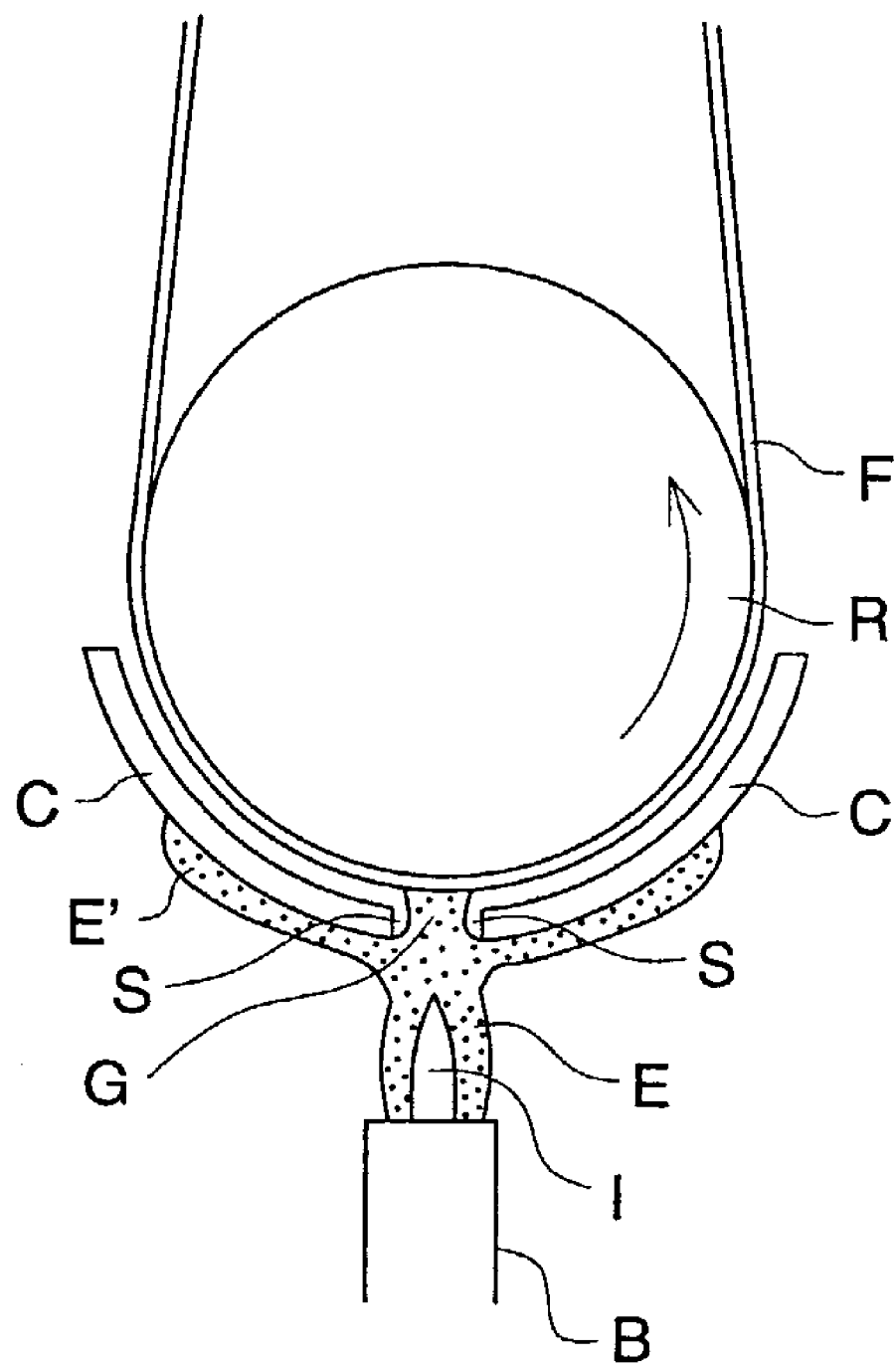
FIG. 3 is an example of a plasma treatment apparatus employing a flame.

Said exterior flame is composed of a flame which is not required for the plasma treatment. When the exterior flame expands, it is impossible to control the treatment. Therefore as shown in FIG. 3, shielding plate (exterior flame regulating shield) C is provided. By so doing, unnecessary exterior flame E' is lead to the outside of the shield (exterior flame regulating shield) C and is remote from a support. By bringing effective flame (regulated flame) G into contact with the surface of sample film F, flame treatment is controlled, and the objective is achieved. FIG. 3 shows burner B, exterior flame E, inner flame I, exterior flame E' which is shielded by a shielding plate and lead to the outside of the shielding plate, effective flame G, effective treatment slit S, and the like, and a state in which effective flame G is brought into contact with the surface of sample film F through the effective treatment slit S.

The protective film of the present invention is subjected to plasma treatment according to the method described above. Thereafter, it is adhered to a polarizer comprised of polyvinyl alcohol film, employing an adhesive to form a polarizing film. In the preferred method, a layer comprising hydrophilic high molecular compounds is further applied onto the protective film. The resulting protective film is then adhered with a polarizer comprised of polyvinyl alcohol film to form a polarizing plate film. By employing high molecular compounds in the protective film, which exhibit high affinity with a polarizer, it is possible to further improve the affinity and adhesive properties between the polarizer and the protective film.

Plural times of plasma treatments are preferable.

The polarizing plate of the present invention will be described. The polarizing plate of the present invention is constituted in such a manner that a polarizer is sandwiched with a first protective film for the polarizing plate and a second protective film for the polarizing plate. In at least one (preferably both) of the first protective film for the polarizing plate and the second protective film for the polarizing plate, the protective film for the polarizing plate of the present invention is employed. By employing the protective film for the polarizing plate of the present invention, it is possible to enhance the durability, especially the durability at high humidity of the polarizing plate.

The liquid crystal apparatus of the present invention comprises a first polarizing plate, a liquid crystal cell, and a second polarizing plate, arranged in the interior of the first polarizing plate and the liquid crystal cell. In addition to these, a light source as well as a reflection plate may be provided. Herein, the first polarizing plate comprises a first protective film provided on the surface of the first polarizer on the side which faces neither the first polarizer nor the liquid crystal cell, and a second protective film provided on the surface of the first polarizer on the side which faces the first protective film as well as the liquid crystal cell. Further, the second polarizing plate comprises a third protective film provided on the surface of a polarizer on the side which faces the second polarizer as well as the liquid crystal cell and a fourth protective film provided on the surface of the second polarizer on the side which faces neither the third protective film nor the liquid crystal cell. Further, the protective film for the polarizing plate of the present invention is employed as at least one (preferably all) of said first protective film, said second protective film, sand third protective film, and said fourth protective film. By so doing, it is possible to enhance the durability of the polarizing plate, especially at high humidity.

Listed as hydrophilic polymers which are used for this purpose are hydrophilic cellulose derivatives (for instance, methyl cellulose, carboxymethyl cellulose, hydroxy cellulose, and the like), polyvinyl alcohol derivatives(for example, polyvinyl alcohol, vinyl acetate-vinyl alcohol copolymers, polyvinyl acetal, polyvinyl formal, polyvinyl benzal, and the like), natural high molecular compounds (for example, gelatin, casein, gum arabic, and the like), hydrophilic polyester derivatives (for example, partially sulfonated polyethylene terephthalate, and the like), polyvinyl derivatives (for example, polyvinylpyrrolidone, polyacrylamide, polyvinyl imidazole, polyvinyl pyrazole, and the like). Further, these hydrophilic polymers may be employed individually or in combination.

In order to enhance adhesive properties of the aforementioned protective film of the present invention with the polarizer, various compounds may be incorporated into the aforementioned hydrophilic polymer layer or a layer comprising such compounds may be separately provided. Listed as such compounds are those represented by general formula (1) or (2) described in Japanese Patent Publication Open to Public Inspection No. 7-333436.

The present invention preferably comprises a layer containing compounds represented by general formula (1) or (2).

A layer comprising such high molecular compounds having a carboxyl group may be employed along with the layer comprising the aforementioned hydrophilic high molecular compounds. However, it is preferably applied to the protective film side of the layer comprising the aforementioned hydrophilic high molecular compounds. Namely, a layer comprising compounds represented by the general formula (1) or (2) is provided on the protective film which has been subjected to plasma treatment. Thereafter, a layer comprising the aforementioned hydrophilic high molecular compounds, which exhibits high affinity with a polarizer, is preferably provided.

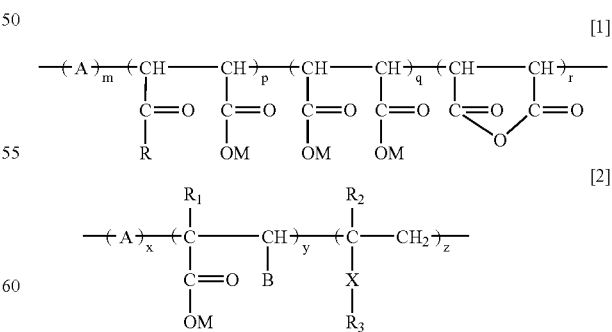

wherein A represent a structure unit formed through polymerization of vinyl monomers, B represents a hydrogen atom, —CO—OM, or —CO—R, M represents a hydrogen atom or a cation, and when Z=0, B represents a hydrogen atom. R represents —O—R' or —N(R')(R"), wherein R' represents an alkyl group, an aralkyl group, an aryl group, a heterocyclic ring residual group, or a non-metallic atom which is necessary to form a heterocyclic ring together with R", R" represents a hydrogen atom, a lower alkyl group, or a non-metallic atom which is necessary to form a heterocyclic ring together with R', $R_1$ and $R_2$ each represents a hydrogen atom, or a lower alkyl group, X represents —CO—O— or —O—CO—, $R_3$ represents a halogenoalkyl group or a halogenoalkyloxyalkyl group, m, p, q, r, x, y, and z each represents a value of mole percent of each monomer, m and x each is 0 to 60, p, q, r, y, and z each is 0 to 100, m+p+q+r=100, x+y+z=100.

In the aforementioned general formulas (1) and (2), listed as vinyl monomers which form structural unit represented by A are, for example, styrene, styrene substituted with a nitro group, a fluorine atom, a chlorine atom, a bromine atom, a chloromethyl group, a lower alkyl group, and the like, vinyl methyl ether, vinyl ethyl ether, vinyl chloroethyl ether, vinyl acetate, vinyl chloroacetate, vinyl propionate, unsaturated acids such as acrylic acid, methacrylic acid or itaconic acid, alkyl esters (said alkyl group is an unsubstituted alkyl group having from 1 to 5 carbon atoms, or an alkyl group substituted with a chlorine atom, a phenyl group, and the like) of acrylic acid or methacrylic acid, phenyl esters (said phenyl group is an unsubstituted phenyl group or a phenyl group substituted with a chlorine atom, a phenyl group, and the like) of acrylic acid or methacrylic acid, acrylonitrile, vinyl chloride, vinylidene chloride, ethylene, acrylamide, acrylamide substituted with an alkyl group having from 1 to 5 carbon atoms, chlorine, a phenyl group, and the like, vinyl alcohol, glycidyl acrylate, acrolein, and the like. Of these, styrene, styrene having a substituent, vinyl acetate, vinyl methyl ether, alkyl acrylate, acrylonitrile, and the like are preferred.

Further, in the aforementioned formulas, the alkyl group represented by R' has preferably from 1 to 24 carbon atoms and may be any of a straight chain alkyl group, a branched chain alkyl group, and a cycloalkyl group, and said alkyl group may have a substituent, which is a hydroxyl group, a hydroxycarbonyl group, —COOM' group (wherein M represents a cation), and the like. Of these, specifically, a halogenoalkyl group substituted with a halogen atom such as fluorine, having from 2 to 18 carbon atoms or a halogenoalkyloxyalkyl group results in preferable results for the purpose of the present invention. Preferred number of halogen atoms, which are substituted with said halogenoalkyl group and said halogenoalkyloxyalkyl group, is between 1 and 37. Said halogenoalkyl group and halogenoalkyloxyalkyl group, and the halogenoalkyl group and halogenoalkyloxyalkyl group represented by $R_3$ in the general formula (2) are preferably expressed by the following general formula (A):

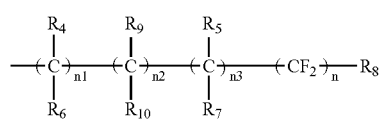

[A]

wherein $R_4$, $R_5$, $R_6$, $R_7$, $R_8$, $R_9$, and $R_{10}$ each represents a hydrogen atom or a fluorine atom, n represents an integer of 1 to 12, n2 is 0 or 1, when n2 is 0, n1 is 0, when n2 is 1, n1 is 2 or 3, and n3 represents an integer of 1 to 17. However, n1+n3 is 1 or 17. Further, when there are at least 2 $R_4$s in the general formula (A), they may be different such as that one represents a hydrogen atom and the other represents a fluorine atom. In the same manner, when there are plurality of each of $R_5$, $R_6$, and $R_7$ in the general formula (A), they may represent different groups.

Further, in the aforementioned general formula (1), when R' represents a halogenoalkyl group or a halogenoalkyloxyalkyl group as described above, R in the aforementioned general formula (1) is preferably —O—R'. Further, there may be an aryl group such as phenol group or an aralkyl group such as a benzyl group, represented by R'. Listed as these substituents are a lower alkyl group substituted with a halogen atom such as a fluorine atom, a chlorine atom, bromine atom, and the like, a hydroxyl group, a hydroxycarbonyl group, a cationic oxycarbonyl group, a nitrile group, a nitro group, and the like.

Further, heterocyclic rings represented by R' or heterocyclic rings formed by R' and R" are saturated or unsaturated heterocyclic rings comprising a oxygen atom, a sulfur atom, or a nitrogen atom, and include, for example, heterocyclic rings selected from heterocyclic rings such as aziridine, pyrrole, pyrrolidine, pyrazole, imidazole, imidazoline, triazole, piperidine, piperazine, oxazine, morpholine, thiazine, and the like. Further, cations represented by M include those such as a ammonium ion, a sodium ion, potassium ion, lithium ion, and the like.

In the present invention, —COOM group containing high molecular compounds, represented by the aforementioned general formula (1) or (2), are employed individually or in combination of two types or more, and those having an average molecular weight of about 500 to about 500,000 (weight average) are preferably employed.

Listed as the aforementioned representative high molecular compounds employed in the present invention can be those described below:

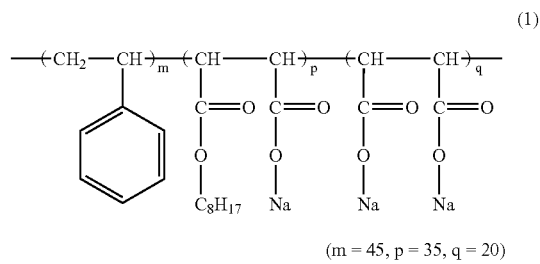

(m = 45, p = 35, q = 20)

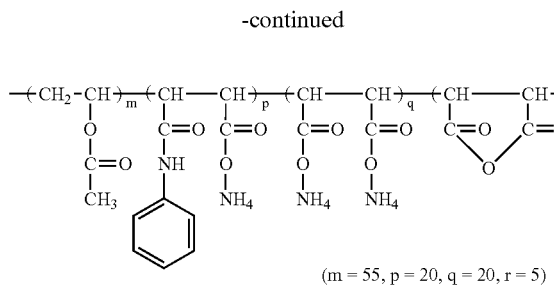
(2)
(m = 55, p = 20, q = 20, r = 5)
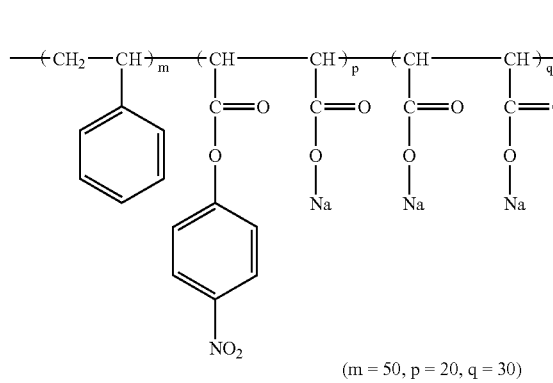
(3)
(m = 50, p = 20, q = 30)
(4)
(m = 50, p = 35, q = 10, r = 5)
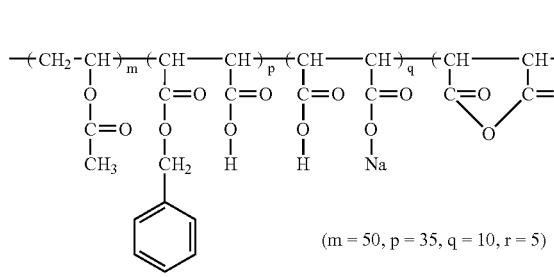
(5)
(m = 40, p = 35, q = 20, r = 5)
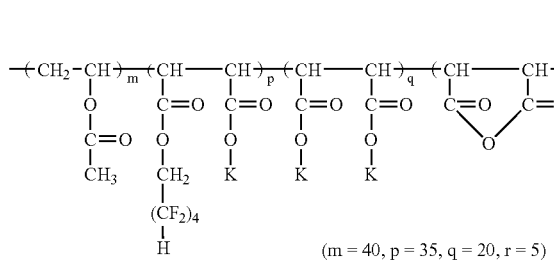
(6)
(m = 55, p = 20, q = 25)
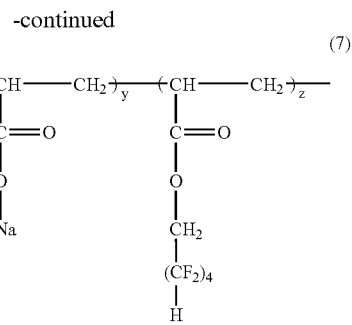
(7)
(x = 10, y = 60, z = 30)
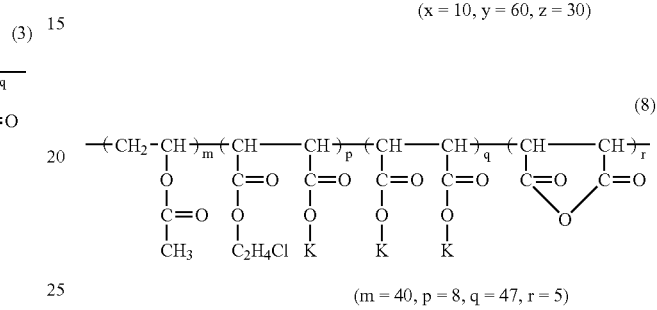
(8)
(m = 40, p = 8, q = 47, r = 5)
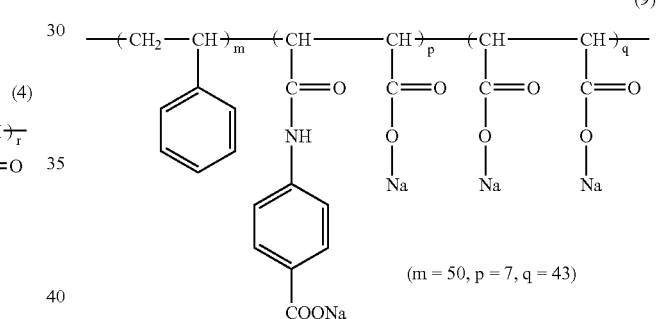
(9)
(m = 50, p = 7, q = 43)
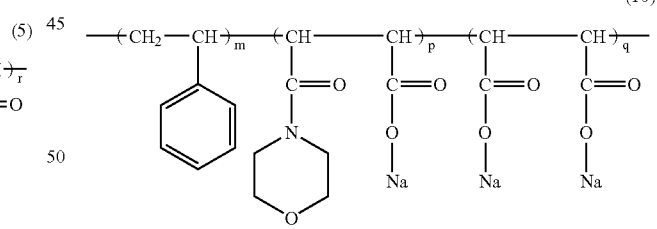
(10)
(m = 40, p = 40, q = 20)
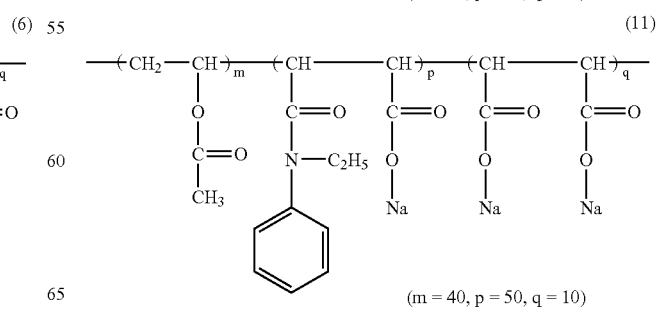
(11)
(m = 40, p = 50, q = 10)

-continued

(12)
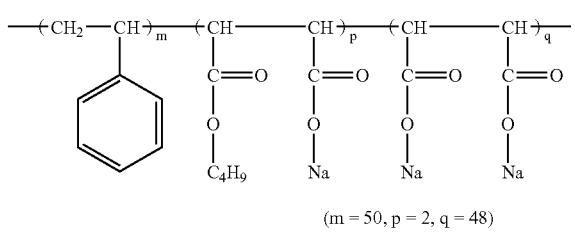
(m = 50, p = 2, q = 48)

(13)
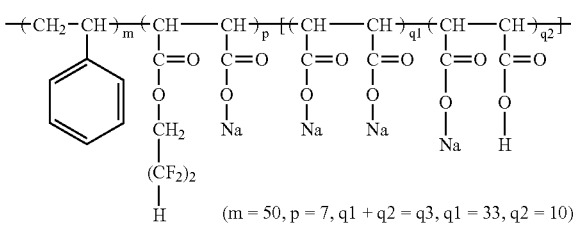
(m = 50, p = 7, q1 + q2 = q3, q1 = 33, q2 = 10)

(14)
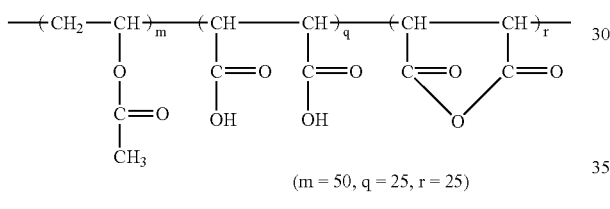
(m = 50, q = 25, r = 25)

(15)
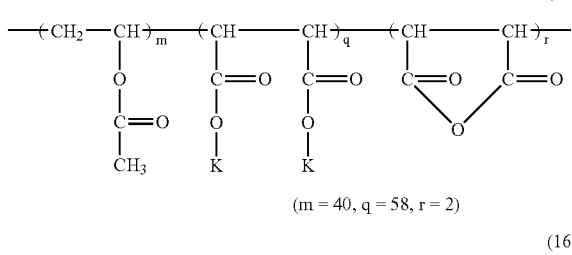
(m = 40, q = 58, r = 2)

(16)
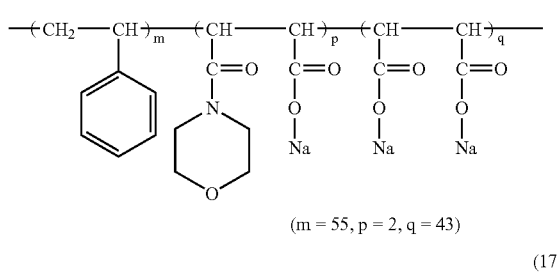
(m = 55, p = 2, q = 43)

(17)
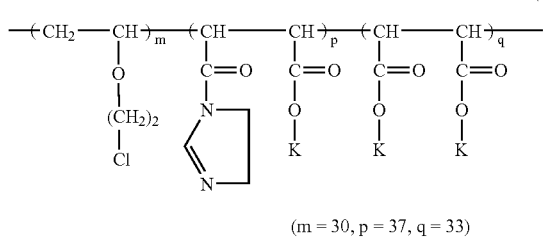
(m = 30, p = 37, q = 33)

(18)
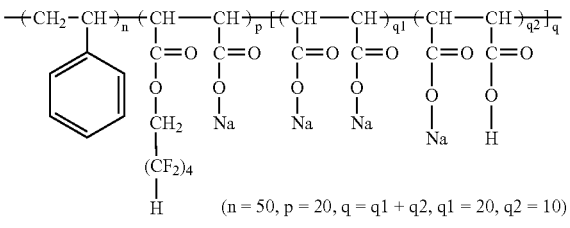
(n = 50, p = 20, q = q1 + q2, q1 = 20, q2 = 10)

(19)
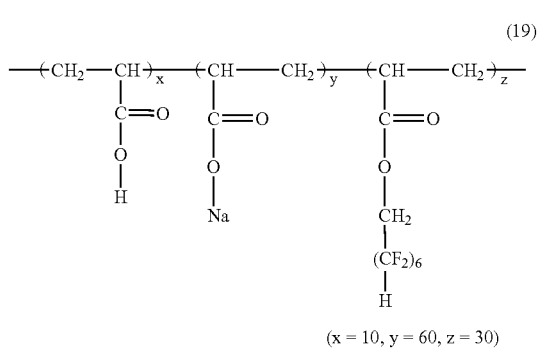
(x = 10, y = 60, z = 30)

High molecular compounds having a —COOM group, represented by the aforementioned general formula (1) or (2) may be synthesized employing methods known in the art. Namely, it is well known that maleic anhydride copolymers are very common copolymers. Derivatives thereof are readily obtained by allowing the maleic anhydride copolymer to react with alcohols or amines which match these. Further, alcohols or amines which match maleic anhydride monomers are subjected to reaction and said compounds are obtained by copolymerizing the purified resultant products with other vinyl monomers. Further, acrylates such as halogenoalkyl, halogenoalkyloxyalkyl, and the like are readily synthesized employing synthetic methods of monomers and polymers described in Journal of Polymer Science, 15 515 to 574 (1955) or British Patent No. 1,121,357.

The employed amount of high molecular compounds represented by the general formula (1) or (2) is preferably between 10 and 1,000 mg/m$^2$, and is most preferably between 20 and 300 mg/m$^2$.

In the aforementioned embodiments of the present invention, the protective film is provide with a layer (hereinafter occasionally referred to an upper layer) comprising at least one of the aforementioned hydrophilic high molecular compounds, and a layer (hereinafter occasionally referred to as a lower layer) comprising at least one of high molecular compounds represented by the aforementioned general formula (1) or (2), comprising at least one of the aforementioned hydrophilic high molecular compounds. For the protective film, transparent resin films may be selected and employed. Such transparent plastic films include, for example, polyester films such as polyethylene terephthalate film, polyethylene naphthalate, and the like, polyethylene film, polypropylene film, cellophane, diacetyl cellulose film, triacetyl cellulose film, cellulose acetate propionate, cellulose acetate butyrate film, polyvinyl chloride film, polyvinylidene chloride film, polyvinyl alcohol film, ethylenevinyl alcohol film, polystyrene film, syndioctatic polystyrene film, norbornane resin film, polycarbonate film, polyacrylate film, polymethyl methacrylate film, polyacrylate film, polyolefin based norbornane resin film, polymethylpentene film, polysulfone film, polyether ether ketone film, polyether sulfone film, polyether imide film, polyimide film, fluorine resin film, nylon film, acrylic film. In the present invention, other than cellulose triacetate film, due to excellent transparency, suitably employed are cellulose ester films such as cellulose diacetate, cellulose acetate butyrate, cellulose acetate phthalate, cellulose propionate, and the like, polycarbonate film, polyester films such as polyethylene terephthalate film, polyethylene naphthalate film, and polyacryl films such as polymethyl methacrylate.

The thickness of the protective film is not particularly limited. However, from functions as well as ease of handling, the thickness is preferably between 10 and 500 μm, and is most preferably between 30 and 300 μm. if desired, UV absorbers, plasticizers, slipping agents, matting agents and the like may be incorporated into the protective layer.

The aforementioned high molecular compounds and other additives, if desired, are dissolved in solvents or dispersed into the same, and a coating composition is prepared. The resulting coating composition is applied onto the surface of the protective film, employing methods, known in the art, such as a gravure coater, a dip coater, a reverse roller coater, an extrusion coater, and the like. Thus the aforementioned layer is formed. The coated amount of the hydrophilic high molecular compounds in the upper layer and of the aforementioned high molecular compounds in the lower layer is preferably between 10 and 1,000 mg/m$^2$, and is more preferably between 20 and 300 mg/m$^2$ to specifically obtain consistent adhesion force as well as excellent finish quality after coating.

Drying methods after coating the aforementioned coating composition is not particularly limited. However, it is preferable that the content of the residual solvent after drying is adjusted to no more than 5 percent by weight. The excessive content of the residual solvent is not preferred because air bubbles are occasionally formed in the adhesion interface between the polarizer and the laminated layer during drying process.

If desired, UV absorbers, slipping agents, matting agents, antistatic agents, crosslinking agents, and surface active agents may be incorporated into the aforementioned layer coating composition of the present invention. The crosslinking agents are preferably incorporated because they enhance adhesion with the polyvinyl alcohol film of the polarizer. Listed as such crosslinking agents are, for example, polyvalent epoxy compounds, aziridine compounds, isocyanate compounds, alums, boron compounds, and the like.

Employed as adhesives, which are employed to adhere a polarizer with the surface on an upper layer of the protective film having the upper and lower layers of the present invention, can be, for example, polyvinyl alcohol based adhesives such as polyvinyl alcohol, polyvinyl butyral, and the like, vinyl based latexes such as butyl acrylate, and the like.

The polarizing plate of the present invention will be described. The polarizing plate of the present invention is constituted in such a manner that a polarizer is sandwiched with a first protective film for the polarizing plate and a second protective film for the polarizing plate. In at least one (preferably both) of the first protective film for the polarizing plate and the second protective film for the polarizing plate, the protective film for the polarizing plate of the present invention is employed. By employing the protective film for the polarizing plate of the present invention, it is possible to enhance the durability, especially the durability at high humidity of the polarizing plate.

The liquid crystal apparatus of the present invention comprises a first polarizing plate, a liquid crystal cell, and a second polarizing plate, arranged in the interior of the first polarizing plate and the liquid crystal cell. In addition to these, a light source as well as a reflection plate may be provided. Herein, the first polarizing plate comprises a first protective film provided on the surface of the first polarizer on the side which faces neither the first polarizer nor the liquid crystal cell, and a second protective film provided on the surface of the first polarizer on the side which faces the first protective film as well as the liquid crystal cell. Further, the second polarizing plate comprises a third protective film provided on the surface of a polarizer on the side which faces the second polarizer as well as the liquid crystal cell and a fourth protective film provided on the surface of the second polarizer on the side which faces neither the third protective film nor the liquid crystal cell. Further, the protective film for the polarizing plate of the present invention is employed as at least one (preferably all) of said first protective film, said second protective film, sand third protective film, and said fourth protective film. By so doing, it is possible to enhance the durability of the polarizing plate, especially at high humidity.

The embodiments of the present invention will be described.

A protective film for a polarizing plate characterized in that a contact angle with respect to pure water on the surface in contact with a polarizer is less than 55°.

The protective film for the polarizing plate described 1 above, characterized in that the surface in contact with a polarizer is subjected to hydrophilicity employing plasma treatment.

The protective film for the polarizing plate described in 1 or 2 above, characterized in that said plasma treatment is selected from vacuum glow discharge, atmospheric pressure glow discharge and flame plasma treatment.

A protective film for the polarizing plate characterized in comprising a coated layer containing at least one of hydrophilic high molecular compounds on the surface which is subjected to plasma treatment.

The protective film of the polarizing plate described in 1, 2, 3 or 4 above, characterized in that cellulose ester film, polycarbonate film, polyester film or polyacrylic film is employed.

A polarizing plate characterized in that the protective film for the polarizing plate described in 1, 2, 3, 4, or 5 is employed.

In a production method of a polarizing plate in which a protective film is adhered on at least one surface of a polarizer, a production method of a polarizing plate characterized in that the surface a protective film for the polarizing plate, which is adhered with a polarizer is subjected to plasma treatment prior to adhesion.

The production method of the polarizing plate described in 7, characterized in that the surface of the protective film for the polarizing plate, which is adhered with a polarizer is subjected to plasma treatment, then to washing process, and is adhered with said polarizer.

In a production method in which at least one surface of a polarizer is adhered with a protective film for the polarizing plate, a production method of a protective film for the polarizing plate characterized in that the surface of said polarizer is subjected to plasma treatment, and then adhered.

The production method of a polarizing plate described in 7 or 8, characterized in that the surface of a polarizer is subjected to plasma treatment.

The production method of a polarizing plate described in any one of claims 7 through 10, characterized in that a protective film for the polarizing plate in which before adhesion of a polarizer, the surface, which is adhered with said polarizer, is subjected to several plasma treatments is employed.

The production method of a polarizing plate described in 11 above, characterized in that a protective film for the polarizing plate is employed in which plasma treatment under conditions in which a C—C bond or a C—H bond of an organic substance on said film is broken, or an amino group is formed on the surface of said film is carried out successively or simultaneously.

13. The production method of a polarizing plate described in 11 or 12 above, characterized in that a protective film for the polarizing plate is employed, which is subjected to plasma treatment in the presence of at least two gases selected from inert gases (argon, neon, and the like), hydrogen, oxygen, hydrogen peroxide, ozone, carbon dioxide, carbon monoxide, nitrogen, nitrogen dioxide, nitrogen monoxide, water vapor, ammonia, and low boiling point organic compounds (lower hydrocarbons, ketones, and the like).

14. The production method of a polarizing plate described in any one of 11, 12, and 13, characterized in that a protective film for the polarizing plate is employed, which is subjected to plasma treatment in the presence of reaction gases comprising at least one of inert gases (argon, neon, and the like), hydrogen, water vapor, and hydrogen peroxide, and at least one of oxygen, water vapor, hydrogen peroxide, and ozone.

15. The production method of a polarizing plate described in any one of 7 through 14 above, characterized in that a plasma treatment is selected from a vacuum glow discharge, atmospheric pressure glow discharge, and a flame plasma treatment.

16. The protective film for the polarizing plate described in 1 through 5 above, characterized in that an unevenness state of at least one surface is in such that an average of central line average roughness Ra of 10 points arbitrarily selected on said film is in the range of 1 to 80 nm and an average of maximum height differences is in the range of 5 to 80 nm.

17. The protective film for the polarizing plate described in any one of 1 through 5 and 16 above, characterized in that the number of hydroxyl groups or amino groups which bond to a carbon atom on the surface of said film is more than that of hydroxyl groups or amino groups which bond to a carbon atom in the interior of the said film.

18. The protective film for the polarizing plate described in 1 through 5, 16, and 17 above, characterized in that in the analysis of the bonding state of a carbon atom of said protective film for the polarizing plate, employing X-ray photoelectron spectroscopy, when a peak having the lowest energy is designated as a first peak, the peak positioned at 1.60±0.3 eV on the higher bonding energy side from the first peak is designated as a second peak, and the peak positioned at 4.10±0.3 eV on the higher bonding energy side from the first peak is designated as a third peak, the bonding state of carbon atom C1s on the surface of at least one surface and in the interior of said protective film for the polarizing plate is in the relationship described below:

$$S-I \geq 0.1$$

wherein S is the intensity of the second peak on the surface of said protective film for the polarizing plate/ the intensity of the first peak on the surface of said protective film for the polarizing plate, and I is the intensity of the second peak in the interior of said protective film for the polarizing plate/the intensity of the first peak of the interior of said protective film for the polarizing plate.

19. The protective film for the polarizing plate described in 1 through 5, 16, and 17 above, characterized in that in the analysis of the bonding state of a carbon atom of said protective film for the polarizing plate, employing X-ray photoelectron spectroscopy, when a peak having the lowest energy is designated as a first peak, the peak located at 1.60±0.3 eV on the higher bonding energy side from the first peak is designated as a second peak, and the peak positioned at 4.10±0.3 eV on the higher bonding energy side from the first peak is designated as a third peak, the bonding state of carbon atom C1s on at least one surface of said protective film for the polarizing plate is in the relationship described below:

$$S \geq 1.60$$

wherein S is the intensity of the second peak on the surface of said protective film for the polarizing plate/ the intensity of the first peak on the surface of said protective film for the polarizing plate.

20. The protective film for the polarizing plate described in 1 through 5, and 16 through 19 above, characterized in that in the analysis of the bonding state of a carbon atom of said protective film for the polarizing plate, employing X-ray photoelectron spectroscopy, when a peak having the lowest energy is designated as a first peak, the peak located at 1.60±0.3 eV on the higher bonding energy side from the first peak is designated as a second peak, and the peak positioned at 4.10±0.3 eV on the higher bonding energy side from the first peak is designated as a third peak, the bonding state of carbon atom C1s on at least one surface of said protective film for the polarizing plate is in the relationship described below:

$$T \geq 0.2$$

wherein T is the intensity of the third peak on the surface of said protective film for the polarizing plate/the intensity of the second peak on the surface of said protective film for the polarizing plate.

21. A protective film for the polarizing plate characterized in that plasma treatment under conditions in which a C—C bond or a C—H bond of an organic substance on said film is broken, or an amino group is formed on the surface of said film is carried out successively or simultaneously.

22. The protective film for the polarizing plate described in any one of 1 through 5, and 16 through 21 above, characterized in that said protective film for the polarizing plate is subjected to plasma treatment in the presence of at least two gases selected from inert gases, hydrogen, oxygen, hydrogen peroxide, ozone, carbon dioxide, carbon monoxide, nitrogen, nitrogen dioxide, nitrogen monoxide, water vapor, ammonia, and low boiling point organic compounds.

23. The protective film for the polarizing plate described in any one of 1 through 5, and 16 through 22 above, characterized in that said protective film is subjected to plasma treatment in the presence of reaction gases comprising at least one of inert gases, hydrogen, water vapor, and hydrogen peroxide, and at least one of oxygen, water vapor, hydrogen peroxide, and ozone.

24. The protective film for the polarizing plate described in any one of 1 through 5, and 16 through 23 above, characterized in that the surface of said protective film for the polarizing plate is subjected to plasma treatment, and thereafter is subjected water washing.
25. The protective film for the polarizing plate described in any one of 16 through 25 above, characterized in comprising any of cellulose ester, polycarbonate, polyester and acrylic resins.
26. The polarizing plate characterized in that the protective film for the polarizing plate described in 16 through 25 above is employed on at least one surface.
27. A production method of a cellulose ester film characterized in that cellulose ester separated from a polarizing plate employing cellulose ester film which is subjected to plasma treatment is reused as all or some of raw material.
28. A production method of a cellulose ester film characterized in that the protective film for the polarizing plate described in 1 through 5 and 16 through 25 above comprises cellulose ester, and cellulose ester separated from said protective film for the polarizing plate is reused as all or some of the raw material for cellulose ester.
29. A production method of a cellulose ester film characterized in that cellulose ester, which is separated from the polarizing plate film described in claim 26, is reused as all or some of the raw material for cellulose ester.
30. The production method of a cellulose ester film described in 29 above, characterized in that a cellulose ester film is an optical film employed in an optical display apparatus.

The present invention will be described with reference to examples below.

EXAMPLES

Example 1

A plasma treatment was carried out as follows. Upper and lower brass-made electrodes having a diameter of 50 mm were provided in a reaction vessel shown in FIG. 1, and a 100 μm thick polyimide as dielectric 3, which was larger than the electrode was adhered with the electrodes. A 150×150 mm and 80 μm thick triacetyl cellulose film (Konica TAC KC8UVSF manufactured by Konica Corp., hereinafter referred to as TAC) was placed on the lower electrode. The gap between electrodes was set at 20 mm, and air in the vessel was replaced with argon.

When the air is replaced with mixed gas, a high frequency voltage of 3,000 Hz and 4,200 V was applied to said electrodes. A red-violet glow discharge was then generated and a plasma was excited. Samples 1 and 2 of the protective film for the polarizing plate were prepared through treatment of 5 and 20 seconds, respectively.

Example 2

Samples 3 and 4 of the protective film for the polarizing plate were prepared in the same manner as Example 1, except that 10 percent of argon gas was replaced with oxygen.

Example 3

Samples 5 and 6 of the protective film for the polarizing plate were prepared in the same manner as Example 1, except that triacetyl cellulose film (TAC film) employed in Examples 1 and 2 was replaced with a 75 μm thick polyethylene terephthalate film (PET film, trade name Daiafoil, manufactured by Daiafoil Hoechst Co., Ltd.).

Example 4

Samples 7 and 8 of the protective film for the polarizing plate were prepared in the same manner as Example 2, except that the TAC film was replaced with the PET film in Example 3.

Example 5

Samples 9 and 10 of the protective film for the polarizing plate were prepared in the same manner as Example 1 and 2, except that the TAC film was replaced with a 75 μm thick polycarbonate film (PC film)(manufactured by Lonza Japan Co., Ltd.) and the 5-second treatment was only carried out.

Example 6

Samples 11 and 12 of the protective film for the polarizing plate were prepared in the same manner as Example 5, except that the PC film was replaced with a 75 μm thick acrylate film (PMMA film) (manufactured by Nihon Carbide Co., Ltd.) and the 20-second treatment was only carried out.

Example 7

In the same manner as Examples 1 and 2, Samples 13 and 14 of the protective film for the polarizing plate were prepared in such a manner that the coating compostion having the composition described below was applied at 20 ml/m² onto the surface of a 80 μm thick TAC film, which was brought into contact with a polarizer, and subsequently dried at 100° C. for 5 minutes.

| (Coating Composition) | |
|---|---|
| <Lower Layer Coating Composition> | |
| Water-soluble polymer (m) described below | 0.5 g |
| Acetone | 40 ml |
| Ethyl acetate | 55 ml |
| Isopropanol | 5 ml |
| <Upper Layer Coating Composition> | |
| Polyvinyl alcohol (Gosenol NH-26, manufactured by Nihon Gosei Kagaku Kogyo Co., Ltd.) | 0.3 g |
| Saponin (surface active agent, manufactured by Merck Co.) | 0.03 g |
| Pure water | 57 ml |
| Methanol | 40 ml |
| Methylpropylene glycol | 3 ml |

Water Soluble polymer (m)

$$-(CH_2-CH)_m-(CH-CH)_q-(CH-CH)_r-$$

with side groups: O–C(=O)–CH₃; C=O, OH; C=O, OH; and a cyclic anhydride (C=O–O–C=O)

$(m = 50, q = 25, r = 25)$

Comparative Example 1

The aforementioned TAC film, PET film, PC film, and PMMA film which were not subjected to plasma treatment were designated as Samples 15, 16, 17, and 18, respectively.

Comparative Example 2

An 80 μm TAC film (Konica TAC KC8UVSF, manufactured by Konica Corp.) was immersed in a 2N sodium hydroxide solution at 60° C. for 30 seconds, washed with water, and subsequently dried. Thus a TAC film of which surface had been subjected to saponification was obtained. The resulting film was designated as Sample 19 of the protective film for the polarizing plate.

Comparative Example 3

Sample 20 of the protective film for the polarizing plate was prepared in such a manner that one side of an 80 μm TAC film (Konica TAC KC8UVSF, manufactured by Konica Corp.) was subjected to corona discharge treatment at conditions of 20 $W/m^2$/minute. The corona discharge treatment was carried out employing a corona treatment device having a multi-knife electrode of SOFTAL Co. The treatment conditions were as follows: two treatments were carried out at a set energy of 40 $W \cdot min/m^2$.

Table 1 shows conditions of the atmospheric pressure plasma treatment, which was applied to Samples 1 through 20 of the protective film, each contact angle, and evaluation results of adhesive properties when each sample was employed to prepare a polarizing plate as described below.

A polarizing plate was prepared by adhering each of the aforementioned protective film with a polarizer as described below.

An 18×5 cm size sample of the protective film was placed on a glass plate so that a surface which had been subjected to plasma treatment or coating faces up.

A polarizer comprised of uniaxially stretched dyed polyvinyl alcohol film having the same size as the protective film sample was immersed in 2 solid portion weight percent polyvinyl alcohol adhesive tank for 1 to 2 seconds, and then adhered with both surface of the polarizer.

An Excessive adhesive, which was attached to the polarizer, was gently wiped off, the resulting polarizer was placed the aforementioned protective film sample, and was arranged in lamination so that the treated surface of the sample film was brought into contact with the adhesive.

The excessive adhesive and air bubbles were removed from the edges of the aforementioned laminated polarizer and protective film employing a hand roller, and adhesion was carried out employing the same. The pressure applied by said hand roller was set at about 0.2 to about 0.3 Mpa and the speed was set at 2 m/minute. The sample obtained by 4. was rested in a dryer at 80° C. for 2 minutes.

<Evaluation of Adhesive Properties>

(Initial Adhesion)

After adhering a polarizer with a protective film, peeling properties were manually evaluated. Evaluation was carried out at a 3 step grade, 1 to 3, based on the degree of material destruction, as shown below.

1: major material destruction occurred. (in Table 1, shown by "A")
2: partial material destruction occurred. However, the peeled area was large between the sample film and the PVA film. (in Table 1, shown by "B")
3: peeling occurred between the sample film and the PVA film. (in Table 1, shown by "C")

(Machinability)

Cutting was carried out employing a single edge blade, and the degree of separation of the adhered surfaces was evaluated according to 3-grade, 1 to 3, described below.

1: no separation of the adhered surfaces was observed. (in Table 1, shown by "A")
2: slight separation of the adhered surfaces was observed. (in Table 1, shown by "B")
3: major separation between adhered surfaces was observed. (in Table 1, shown by "C")

(Durability)

Materials were stored at the condition (a) of 75° C. and 90% relative humidity and the condition (b) of 90° C. for 500 hours, and any peeled width from the edge was measured. Symbols in Table 1 indicate the following.

A: within 0.5 mm
B: 0.6 to 1.5 mm
C: 1.6 mm or more

Further, adhesive properties, which are the same as Comparative Sample 19 (the target of the present invention) or better than that, are commercially viable. In Table 1, evaluation "A" is given.

TABLE 1

| Protective film No. | Transparent resin film | Condition Main component of gas | Processing time (sec) | Hydrophilic layer | Contact angle of protective film | Adhesion property of polarising plate Initial adhesion | Processability | (a) | (b) | |
|---|---|---|---|---|---|---|---|---|---|---|
| 1 | TAC | Ar | 5 | None | 41 | A | A | B | A | Inv. |
| 2 | TAC | Ar | 20 | None | 39 | A | A | A | A | Inv. |
| 3 | TAC | Ar—$O_2$ | 5 | None | 45 | A | A | A | A | Inv. |
| 4 | TAC | Ar | 20 | None | 41 | A | A | A | A | Inv. |
| 5 | PET | Ar | 5 | None | 46 | A | A | B | A | Inv. |
| 6 | PET | Ar | 20 | None | 41 | A | A | A | A | Inv. |
| 7 | PET | Ar—$O_2$ | 5 | None | 47 | A | A | B | A | Inv. |
| 8 | PET | Ar—$O_2$ | 20 | None | 42 | A | A | A | A | Inv. |
| 9 | PC | Ar | 5 | None | 42 | A | A | B | A | Inv. |
| 10 | PC | Ar—$O_2$ | 5 | None | 41 | A | A | A | A | Inv. |
| 11 | PMMA | Ar | 20 | None | 43 | A | A | B | B | Inv. |
| 12 | PMMA | Ar—$O_2$ | 20 | None | 40 | A | A | A | A | Inv. |
| 13 | TAC | Ar | 5 | Provided | 21 | A | A | A | A | Inv. |
| 14 | TAC | Ar—$O_2$ | 5 | Provided | 18 | A | A | A | A | Inv. |
| 15 | TAC | NP | — | None | 60 | C | C | C | C | Comp. |
| 16 | PET | NP | — | None | 71 | C | C | C | C | Comp. |

TABLE 1-continued

| Protective film No. | Transparent resin film | Condition Main component of gas | Processing time (sec) | Hydrophilic layer | Contact angle of protective film | Adhesion property of polarising plate Initial adhesion | Processability | (a) | (b) | |
|---|---|---|---|---|---|---|---|---|---|---|
| 17 | PC | NP | — | None | 73 | C | C | C | C | Comp. |
| 18 | PMMA | NP | — | None | 76 | C | C | C | C | Comp. |
| 19 | TAC | Alkali Saponification | — | None | 15 | A | A | A | A | Comp. |
| 20 | TAC | Corona Discharge | — | None | 55 | C | C | C | C | Comp. |

NP: Not processed,
Inv.: Invention,
Comp.: Comparative

It is found that samples of the present invention exhibit excellent adhesive properties, as well as excellent machinability as a polarizing plate.

Example 8

Samples 21 and 22 of the protective film for the polarizing plate were prepared in such a manner that an 80 μm thick TAC film (Konica TAC KC8UVSF), manufactured by Konica Corp., was placed in a continuous type vacuum plasma discharge treatment apparatus, and was subjected to plasma treatment in conditions of a power source frequency of 13.56 MHz, a discharge area of 0.08 m², a power source output of 8,000 W/m², a vacuum of 0.1 torr, and an introduced gas of either oxygen or nitrogen.

Example 9

Samples 23 and 24 were prepared in the same manner as Example 8, except that the TAC film was replaced with at a 75 μm thick PET film.

Example 10

Samples 25 and 26 were prepared in such a manner that a coating composition layer comprising hydrophilic compounds, which was prepared in the same manner as Example 7, was provided on the surface, which was brought into contact with a polarizer, of an 80 μm TAC film which had been subjected to plasma treatment in the same manner as Example 8.

Table 2 shows vacuum plasma treatment conditions for Samples 21 through 26 of the protective film, which have been subjected to plasma treatment, measurement results of contact angles on the surface of said protective films, and evaluation results of adhesive properties when polarizing plates were prepared employing said protective films with the use of the same method described above.

TABLE 2

| Protective film No. | Transparent resin film | Condition Reaction gas | Processing time (sec) | Hydrophilic layer | Contact angle of protective film | Adhesion property of polarising plate Initial adhesion | Processability | (a) | (b) | |
|---|---|---|---|---|---|---|---|---|---|---|
| 21 | TAC | Oxygen | 10 | None | 38 | A | A | A | A | Inv. |
| 22 | TAC | Nitrogen | 15 | None | 40 | A | A | B | A | Inv. |
| 23 | PET | Oxygen | 10 | None | 43 | A | A | B | A | Inv. |
| 24 | PET | Nitrogen | 15 | None | 45 | A | A | A | A | Inv. |
| 25 | TAC | Oxygen | 10 | Provided | 21 | A | A | A | A | Inv. |
| 26 | TAC | Nitrogen | 15 | Provided | 20 | A | A | A | A | Inv. |

Inv.: Invention

Example 11

An 80 μm thick TAC film, manufactured by Konica Corp., was subjected to flame treatment in conditions shown in Table 3, employing a method described in Japanese Patent Publication Open to Public Inspection No. 11-184042. FIG. 3 shows an employed apparatus. Further, contact time of the film with a flame was about 0.01 second. Samples 27 and 28 of the protective film for the polarizing plate were prepared under conditions in which said samples were subjected to effective plasma treatment. Such conditions were as follows: the ratio a/b of the contact area a with a exterior flame to the maximum area of an inner flame b and the distance c (in mm) from the top of the inner flame were set as shown in Table 3.

The maximum area of the inner flame as described herein means a value obtained by multiplying the central width of inner flame I in FIG. 3 with the treated width of the film, and the contact area of the exterior flame as described herein means a value obtained by multiplying the width of effective flame G (a part of the exterior flame) in contact with a treated film with the treated width of the film.

Example 12

Samples 29 and 30 of the protective film for the polarizing plate were prepared in the same manner as Example 11, except that the TAC film was replaced with a 75 μm thick PET film.

Example 13

Samples 31 and 32 were prepared in such a manner that a coated layer comprising hydrophilic compounds, which was prepared in the same manner as Example 7, was provided on the surface of a TAC film, which was brought into contact with a polarizer, which had been subjected to plasma treatment in the same manner as Example 11.

Example 14

A protective film for the polarizing plate was prepared in the same manner as Sample 29 in Example 12 and further by providing a coated layer comprising hydrophilic compounds in the same manner as Example 7. The resulting sample was designated as Sample 33.

Table 3 shows flame plasma treatment conditions for Samples 27 through 33 of the protective film, which have been subjected to plasma treatment, measurement results of contact angles on the surface of said protective films, and evaluation results of adhesive properties when polarizing plates were prepared employing said protective films with the use of the same method as described above.

TABLE 3

| Protective film No. | Transparent resin film | Flame condition a/b | Flame condition c (mm) | Hydrophilic layer | Contact angle of protective film | Adhesion property of polarising plate Initial adhesion | Processability | (a) | (b) | |
|---|---|---|---|---|---|---|---|---|---|---|
| 27 | TAC | 1 | 5 | None | 38 | A | A | A | A | Inv. |
| 28 | TAC | 5 | 5 | None | 40 | A | A | B | A | Inv. |
| 29 | PET | 5 | 5 | None | 43 | A | A | B | A | Inv. |
| 30 | PET | 5 | 10 | None | 45 | A | A | B | B | Inv. |
| 31 | TAC | 1 | 5 | Provided | 20 | A | A | A | A | Inv. |
| 32 | TAC | 5 | 5 | Provided | 20 | A | A | A | A | Inv. |
| 33 | PET | 5 | 5 | Provided | 19 | A | A | A | A | Inv. |

Example 15

An 80 μm thick triacetyl cellulose film (Konica TAC KC8UX2MW, manufactured by Konica Corp.) was continually subjected to plasma treatment at atmospheric pressure, employing an apparatus shown in FIG. 2. Namely, air accompanied with a conveyed film was removed employing a roll. The resulting film was introduced into a chamber filled with a reaction gas comprised of helium gas and water vapor, and was subjected to plasma treatment at a power source frequency of 13.56 MHz and a power source output of 8 kW/m$^2$. Thus a protective film was obtained.

A polyvinyl alcohol film (having a degree of polymerization of 4,000, manufactured by Kuraray Co., Ltd.) was uniaxially stretched (at a stretching temperature of 110° C., and a stretching factor of 4.5) to obtain a polarizing base material. The resulting polarizing base material was immersed in an aqueous solution comprised of iodine/potassium iodide/0.075 kg of water/5 kg/100 kg in ratio for 60 seconds, while tension was applied, and subsequently was immersed in an aqueous boric acid containing solution comprised of potassium iodide/boric acid/6 kg of water/7.5 kg/100 kg at 70° C. for 300 seconds. The resulting polarizing base material was washed with pure water, and subsequently dried to prepare a polarizer. After drying, said polarizer was adhered with a polyvinyl alcohol film which was supplied with a polyvinyl alcohol based adhesive on both sides at a pressure of 0.2 to 0.3 Mpa and a speed of 2 m/min, employing the aforementioned roller, and was stored at 80° C. for 2 minutes. The resulting material was designated as Polarizing Plate A of the present invention.

Example 16

A polarizing plate was prepared in the same manner as Example 15, except that after a triacetyl cellulose film was subjected to plasma treatment, the resulting film was washed with water at 40° C. and subsequently dried. Said polarizing plate was designated as Polarizing Plate B of the present invention.

Example 17

A 40 μm thick triacetyl cellulose film (Konica TAC KC4UXMW, manufactured by Konica Corp.) was continually subjected to plasma treatment at atmospheric pressure, employing an apparatus shown in FIG. 2. Namely, air accompanied with a conveyed film was removed employing a roll. The resulting film was introduced into a chamber filled with a reaction gas comprised of argon gas containing 10 percent of oxygen and 4 percent of hydrogen gas, and was subjected to plasma treatment at a power source frequency of 13.56 MHz and a power source output of 8 kW/m$^2$.

A polyvinyl alcohol film (having a degree of polymerization of 4,000, manufactured by Kuraray Co., Ltd.) was uniaxially stretched (at a stretching temperature of 110° C., and a stretching factor of 4.5) to obtain a polarizing base material. The resulting polarizing base material was immersed in an aqueous solution comprised of iodine/potassium iodide/0.075 kg of water/5 kg/100 kg in ratio for 60 seconds, while tension was applied, and subsequently was immersed in an aqueous boric acid containing solution comprised of potassium iodide/boric acid/6 kg of water/7.5 kg/100 kg at 70° C. for 300 seconds. The resulting polarizing base material was washed with pure water, and subsequently dried to prepare a polarizer. The resulting polyvinyl alcohol film was continually subjected to plasma treatment at atmospheric pressure, employing an apparatus shown in FIG. 2. Namely, air accompanied with a conveyed film was removed employing a roll. The resulting film was introduced into a chamber filled with a reaction gas comprised of argon gas and water vapor, and was subjected to plasma treatment at a power source frequency of 13.56 MHz and a power source output of 8 kW/m². Said triacetyl cellulose film was adhered with a polyvinyl alcohol film which was supplied with a polyvinyl alcohol based adhesive on both sides at a pressure of 0.2 to 0.3 Mpa and a speed of 2 m/min, employing a roller, and was dried at 80° C. for 2 minutes. The resulting material was designated as Polarizing Plate C of the present invention.

Example 18

An 80 μm thick triacetyl cellulose film (Konica TAC KC8UVSF, manufactured by Konica Corp.) was immersed in a sodium hydroxide solution of 2 mole/liter at 60° C. for 90 seconds, washed with water and subsequently dried. Thus said film was subjected saponification.

A polyvinyl alcohol film (having a degree of polymerization of 4,000, manufactured by Kuraray Co., Ltd.) was uniaxially stretched (at a stretching temperature of 110° C., and a stretching factor of 4.5) to obtain a polarizing base material. The resulting polarizing base material was immersed in an aqueous solution comprised of iodine/potassium iodide/0.075 kg of water/5 kg/100 kg in ratio for 60 seconds, while tension was applied, and subsequently was immersed in an aqueous boric acid containing solution comprised of potassium iodide/boric acid/6 kg of water/7.5 kg/100 kg at 70° C. for 300 seconds. The resulting polarizing base material was washed with pure water, and subsequently dried to prepare a polarizer. The resulting polyvinyl alcohol film was continually subjected to plasma treatment at atmospheric pressure, employing an apparatus shown in FIG. 2. Namely, air accompanied with a conveyed film was removed employing a roll. The resulting film was introduced into a chamber filled with a reaction gas comprised of argon gas and water vapor, and was subjected to plasma treatment at a power source frequency of 13.56 MHz and a power source output of 8 kW/m². Said triacetyl cellulose film was adhered with a polyvinyl alcohol film which was supplied with a polyvinyl alcohol based adhesive on both sides at a pressure of 0.2 to 0.3 Mpa and a speed of 2 m/min, employing a roller, and was dried at 80° C. for 2 minutes. The resulting material was designated as Polarizing Plate D of the present invention.

Example 19

An 80 μm thick cellulose acetate propionate film having the composition described below was subjected to plasma treatment in the same manner as Example 1, except that the mixed gas in the reaction vessel was replaced with argon gas containing water vapor, having a relative humidity of 80 percent. A polarizing plate was prepared in the same manner as Example 17 employing the resulting cellulose triacetate propionate instead of triacetyl cellulose film. The resulting material was designated as Polarizing Plate E of the present invention.

| <Cellulose Acetate Propionate Film> | |
|---|---|
| Cellulose acetate propionate (having a substitution degree of the acetyl group of 2.0, and a substitution degree of the propionyl group of 0.8) | 100 kg |

-continued

| <Cellulose Acetate Propionate Film> | |
|---|---|
| Triphenyl phosphate | 9 kg |
| Ethylphtharylethyl glycolate | 4 kg |
| Tinuvin 109 (manufactured by Ciba Specialty Chemicals) | 1.1 kg |
| Tinuvin 171 (manufactured by Ciba Specialty Chemicals) | 0.9 kg |
| Aerosil 200V (Nihon Aerosil Co., Ltd.) | 0.1 kg |

Comparative Example 4

An 80 μm thick triacetyl cellulose film (Konica TAC KC8UX2MW, manufactured by Konica Corp.) was immersed in a solution of 2 mole KOH/liter at 60° C., washed with water, and subsequently dried to obtain Triacetyl Cellulose Film F.

A polyvinyl alcohol film (having a degree of polymerization of 4,000, manufactured by Kuraray Co., Ltd.) was uniaxially stretched (at a stretching temperature of 110° C., and a stretching factor of 4.5) to obtain a polarizing base material. The resulting polarizing base material was immersed in an aqueous solution comprised of iodine/potassium iodide/0.075 kg of water/5 kg/100 kg in ratio for 60 seconds, while tension was applied, and subsequently was immersed in an aqueous boric acid containing solution comprised of potassium iodide/boric acid/6 kg of water/7.5 kg/100 kg at 70° C. for 300 seconds. The resulting polarizing base material was washed with pure water, and subsequently dried to prepare a polarizer. After drying, the aforementioned Triacetyl Cellulose Film F was adhered with a polyvinyl alcohol film which was supplied with a polyvinyl alcohol based adhesive on both sides at a pressure of 0.2 to 0.3 Mpa and a speed of 2 m/min, employing a hand roller, and was rested at 80° C. for 2 minutes. The resulting material was designated as Comparative Polarizing Plate F of the present invention. In the same manner, Comparative Polarizing Plate G was prepared employing an 80 μm thick triacetyl cellulose film (Konica TAC KC8UX2MW, manufactured by Konica Corp.) which was not subjected to the aforementioned alkali treatment.

Machinability of Polarizing Plates A through E prepared in Examples 15 through 19, as well as Comparative Polarizing Plates F and G prepared in Comparative Example 4 were evaluated.

(Machinability)

Cutting was carried out employing a single edge blade, and the degree of peeling of adhered surfaces was evaluated according to 3 step grade, 1 to 3, described below.

A: at the cut section of the polarizing plate, no peeling of the adhered surfaces (between the cellulose ester film and the polyvinyl alcohol film) was observed.

B: at the cut section of the polarizing plate, peeling of the adhered surfaces (between the cellulose ester film and the polyvinyl alcohol film) was partially observed.

C: at the cut section of the polarizing plate, major peeling of the adhered surfaces (between the cellulose ester film and the polyvinyl alcohol film) was observed.

TABLE 4

| Polarizing Plate | Machinability | Remarks |
|---|---|---|
| Polarizing Plate A | A | Present Invention |
| Polarizing Plate B | A | Present Invention |

TABLE 4-continued

| Polarizing Plate | Machinability | Remarks |
| --- | --- | --- |
| Polarizing Plate C | A | Present Invention |
| Polarizing Plate D | A | Present Invention |
| Polarizing Plate E | A | Present Invention |
| Polarizing Plate F | A | Comparative Example |
| Polarizing Plate G | C | Comparative Example |

As can be seen in Table 4, the polarizing plate of the present invention exhibits excellent adhesion. Thus it has become possible to provide the same machinability as the polarizing plate, in which a conventional cellulose ester film which is subjected to saponification, is employed.

Example 20

An 80 µm thick triacetyl cellulose film (Konica TAC KV8UX2MW, manufactured by Konica Corp.) was subjected to plasma treatment in the same manner as Example 1, except that the gas mixture in the reaction vessel was replaced with argon gas containing 4 percent of hydrogen. Further, said film was subjected to plasma treatment in the same manner while the gas mixture in the reaction vessel was replaced with argon gas containing water vapor with a relative humidity of 80 percent.

A polarizing plate was prepared in the same manner as Example 17, employing the resulting triacetyl cellulose, and was designated as Polarizing Plate H of the present invention.

The machinability was evaluated employing the same method as Example 19, and was graded to be A.

In order to evaluate the adhesion of adhered surfaces of Polarizing Plate H of the present invention H as well as Comparative Polarizing Plate F, the triacetyl cellulose film of the sectional part of the cut polarizing plate was peeled off employing a cutter. When the triacetyl cellulose film of both sides of peeled parts was pulled, the polyvinyl alcohol film and the triacetyl cellulose film which compose both polarizers were hardly peeled off, and both triacetyl cellulose films themselves were torn. As described above, it was confirmed that Polarizer H of the present inventing has the same adhesion as Comparative Polarizing Plate F.

Example 21

An 80 µm thick triacetyl cellulose film (Konica TAC KV8UX2MW, manufactured by Konica Corp.) was subjected to plasma treatment for 5 seconds in the same manner as Example 1, except that the gas mixture in the reaction vessel was replaced with argon gas containing 10 percent of oxygen and 4 percent of hydrogen. The resulting triacetyl cellulose film was designated as Triacetyl Cellulose Film J.

A polarizing plate was prepared in the same manner as Example 17, employing said Triacetyl Cellulose Film J, and was designated as Polarizing Plate J of the present invention.

The adhesion of adhered surfaces of Polarizing Plate J was evaluated employing the same method as Example 20. As a result, it was confirmed that Polarizing Plate J had the same adhesion as Polarizing Plate F. Comparative Polarizing Plate G prepared by employing a triacetyl cellulose film which was not subjected to saponification was readily peeled off and the adhesion was insufficient.

Measurement of surface roughness Ra as well as maximum height difference P–V, and the analysis of carbon bonding state were carried out employing method described below for each of the aforementioned Polarizing Plate J, Polarizing Plate F of Comparative Example 4, plasma-treated triacetyl cellulose film and non-treated triacetyl cellulose employed in G, and saponified triacetyl cellulose film (Triacetyl Cellulose Film F).

Measurement of Surface Roughness Ra and Maximum Height Difference P–V

A surface shape was measured under a dynamic mode (hereinafter referred to as DFM mode), employing a scanning type probe microscope SPI3800N multifunctional type unit SPA400 manufactured by Seiko Instruments. The employed cantilever was SI-DF20 (made of silicone, having a spring constant of 20.0 N/m, a torsion spring constant of 100.0 N/m, a resonance frequency of 120 to 150 Hz, a lever length of 200.0 µm, and a needle height of 3.00 µm). A sample was cut into about 1 cm cube, which was placed on the leveled sample stand on a piezo scanner, and a cantilever was allowed to approach the sample surface. When the cantilever reached a region in which an inter-atomic force works, scan was carried out in the X and Y directions, and the unevenness of the sample was captured by piezo displacement in the Z direction. The piezo scanner was employed which was capable of scanning X, Y 20 µm, and Z 2 µm. Scanning frequency was set at 1.00 Hz and a measurement area was set at 0.5×0.5 µm. The number of data for X and Y was 256 points, respectively. The obtained three-dimensional data were corrected employing the first order gradient correction.

Analysis of Carbon Bond State

A QUANTUM-2000, manufactured by PHI Co. in the United Sates, was employed as a measurement instrument. Monochromatic Al X-ray source was employed and the beam diameter of X-ray was set at 100 µmφ. Spectra were obtained by scanning said X-ray beam in an area of 1.5×0.1 mm. Regarding the energy resolution, when Ag3d5/2 peak was measured employing a cleaned Ag plate, its half bandwidth was 0.59 eV. Photoelectron emitting angle was 90°. For static charge correcting process, an electron beam as well as an argon ion beam was employed (electrons were irradiated at 1 eV, and ions were irradiated at 14 eV). Measured energy interval was set at interval of 0.05 eV, and integration was carried out until C1s peak reached 15,500 counts.

Surface and Interior

The measurement of the interior of a film can be carried out by employing as a sample the surface obtained by shaving a film surface employing a cleaned knife. In the present measurement, the following method was employed. A film was adhered on a flat board (such as silicon wafer, slide glass, and the like) employing an adhesive so as to obtain flatness. The adhesive is selected which dissolves the film as little as possible. In this measurement, an epoxy based adhesive was employed. The edge of a glass knife in a microtome employed was arranged so as to be in parallel with the film surface and an about 0.8 µm surface layer was shaved.

Figure 4:
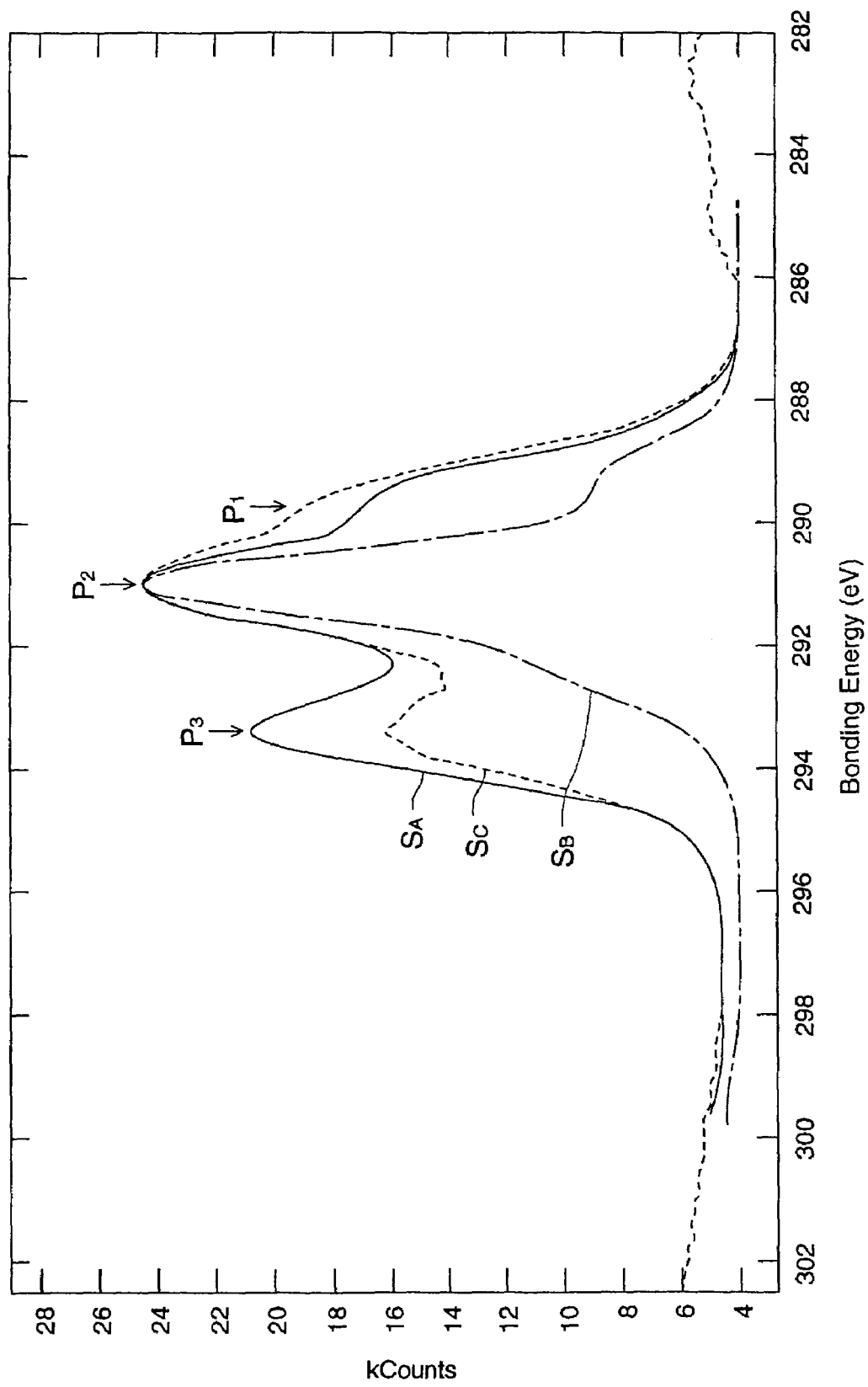
FIG. 4 is photoelectron spectra of a film.

FIG. 4 shows surface photoelectron spectra. In FIG. 4, $P_1$, $P_2$, and $P_3$ show a first peak, a second peak, and a third peak, respectively. $S_A$ is the photoelectron spectrum of Cellulose Ester Film J (which was subjected to plasma treatment), $S_B$ is the spectrum of Comparative Cellulose Ester Film F (which was subjected to alkali saponification), and $S_C$ is the spectrum of the untreated cellulose ester film.

Referring to photoelectron spectra which show the intensity of peaks on the surface, as well as in the interior obtained as described above, the S, I, and T values, described below, which show the ratio of each bonding state were obtained.

S=the intensity of the second peak on the surface of the protective film for the polarizing plate/the intensity of the first peak on the surface of the protective film for the polarizing plate I=the intensity of the second peak on the interior of the protective film for the polarizing plate/the intensity of the first peak on the interior of the protective film for the polarizing plate T=the intensity of the third peak on the surface of the protective film for the polarizing plate/the intensity of the second peak on the surface of the protective film for the polarizing plate Table 5 shows measurement results of the surface roughness Ra as well as the maximum height difference P–V, and analytical results of the carbon bonding state on the surface and the interior.

TABLE 5

| | Ratio of Peak Intensity | | | Surface Roughness | |
|---|---|---|---|---|---|
| | S | I | T | Ra (nm) | P-V (nm) |
| Plasma Treatment | 1.75 | 1.55 | 0.8 | 3.4 | 21 |
| Saponification | 4.42 | 4.41 | 0.1 | 0.6 | 3.0 |
| Non-treatment | 1.55 | 1.54 | 0.58 | 0.3 | 2.3 |

Example 22

Polarizers were separated and removed from cut scrap of the cellulose ester film which was subjected to plasma treatment in Example 15 and Polarizing Plates A. Washed cellulose ester was dissolved in a mixed solvent consisting of methylene chloride and ethanol (a mixed solvent of 92 g of methylene chloride with 8 g of ethanol), and a dope having a solid portion concentration of 18 percent by weight was prepared. The ratio of the cellulose ester separated from the polarizing plates was 50 percent of the total.

The resultant dope was filtered to remove foreign matter, and cast onto a casting belt made of stainless steel maintained at 33° C. On said casting belt, the solvent was evaporated until the content of the residual solvent became 80 percent. Thereafter, a resulting film was peeled from the casting belt and subsequently dried at 100° C. An obtained film was designated as Cellulose Ester film K of the present invention.

Polarizers were separated and removed from cut scrap of the cellulose ester film which was subjected to alkali saponification in Example 4 and Polarizing Plates F. Washed cellulose ester was dissolved in a mixed solvent consisting of methylene chloride and ethanol (a mixed solvent of 92 g of methylene chloride with 8 g of ethanol), and a dope having a solid portion concentration of 18 percent by weight was prepared. The ratio of the cellulose ester separated from the polarizing plates was 50 percent of the total. The resultant dope was filtered to remove foreign matter, and in the same manner as above, cast onto a casting belt to prepare a cellulose ester film. An obtained film was designated as Comparative Cellulose Ester film K of the present invention.

The 80 μm thick cellulose ester film prepared as described above was sandwiched with two polarizing plates. The polarizing plate was arranged so that the stretching direction of the polarizer is in the right angle (cross Nicol state). Thereafter, one surface of the polarizing plate was irradiated with light and the other surface was observed employing a microscope (magnification factor of 30 under a transmission light source). The number of foreign particles, which looked white due to light transmission, per 25 $mm^2$ was measured at four different areas. The obtained number was denoted as one per 1 $cm^2$. The measurement was carried out 5 times and the average was designated as the number of luminescent spot foreign particles. Results showed that the number of luminescent spot foreign particles of Cellulose Ester Film I of the present invention was 8/$cm^2$, while the number thereof of Comparative Cellulose Ester Film K was 62/$cm^2$. As shown in the results, Cellulose Ester Film I of the present invention resulted in less number of luminescent spot foreign particles. Thus it is found that the cellulose ester film of the present invention is more suitable for recycling.

It has become possible to obtain a protective film for the polarizing plate employed as a liquid crystal element and the like without employing chemicals for saponification, which are not preferred for work and complex processing, and thus to obtain a polarizing plate which exhibits excellent machinability.

While the present invention has been described with reference to specific embodiments thereof, it will be apparent to one skilled in the art that various changes and modifications can be made therein without departing from the spirit and scope thereof.

DESCRIPTION OF REFERENCE NUMERALS AND SYMBOLS 1. electrodes
2. F sample (film)
3. dielectric
4. and 6. flow inlet
5. and 7. flow outlet
8. and 9. nip roll
10., 11., and 17. pressure-reduced supplementary chamber
12. treatment chamber
13. and 14. planar electrodes
15. high frequency power source
16. ground
B burner
C shielding plate
E and E' exterior flame
I inner flame
G effective flame
R roller
S effective treatment slit
$P_1$, $P_2$, and $P_3$, photoelectron spectrum peak
$S_A$, $S_B$, and $S_C$ photoelectron spectrum

The invention claimed is:

1. A production method of a protective resin film for a polarizing plate, comprising the steps of:
   preparing a resin film, and
   subjecting the prepared resin film to an atmospheric pressure plasma treatment in a gaseous mixture consisting of at least two types of gases selected from the group consisting of argon, neon, hydrogen, oxygen, hydrogen peroxide, ozone, carbon dioxide, carbon monoxide, nitrogen, nitrogen dioxide, nitrogen monoxide, water vapor, ammonia, ketone, and alcohol to make a surface of the resin film hydrophilic.

2. The production method described in claim 1 wherein the plasma treatment is carried out a plurality of times.

3. The production method described in claim 1, wherein the plasma treatment is subsequently or simultaneously carried out under the conditions in which the C—C bond or C—H bond of the resin on the film surface is broken, or a hydroxyl group or amino group is formed on the film surface.

4. The production method of claim 1, wherein the plasma treatment is carried out in a gaseous mixture consisting of at least one gas selected from the group consisting of argon, neon, hydrogen, water vapor, and hydrogen peroxide, and at least one gas selected from the group consisting of oxygen, water vapor, hydrogen peroxide and ozone.

5. The production method of claim 1, wherein the plasma treatment is carried out by a plasma generating apparatus having an electrode on a surface of which a dielectric is provided.

6. The production method of claim 5, wherein the dielectric is glass, ceramics or polyimide.

7. The production method of claim 1, wherein the resin film is a hydrophilic polymer selected from the group consisting of a hydrophilic cellulose derivative, a polyvinyl alcohol derivative, a natural high molecular compound, a hydrophilic polyester derivative and a polyvinyl derivative.

8. The production method of claim 1, wherein the plasma treatment is glow discharge plasma treatment.

9. A production method of a polarizing plate comprising following steps:
   a step in which the surface of a polarizer or a surface of a protective film for the polarizing plate is subjected to an atmospheric pressure plasma treatment, and
   a step in which the protective film subjected to plasma treatment for the polarizing plate is adhered with at least one surface of the polarizing plate
   wherein the plasma treatment is carried out in a gaseous mixture consisting of at least two types of gases selected from the group consisting of argon, neon, hydrogen, oxygen, hydrogen peroxide, ozone, carbon dioxide, carbon monoxide, nitrogen, nitrogen dioxide, nitrogen monoxide, water vapor, ammonia, ketone, and alcohol.

10. The production method described in claim 9, wherein after plasma treatment and before adhering the protective film for the polarizing plate with a polarizer, the surface which has been subjected to plasma treatment is washed with water.

* * * * *